US012711076B2

(12) United States Patent
Peresse et al.

(10) Patent No.: US 12,711,076 B2
(45) Date of Patent: Aug. 18, 2026

(54) PAGE TABLE ENTRY CACHES WITH MULTIPLE TAG LENGTHS

(71) Applicant: SiFive, Inc., Santa Clara, CA (US)

(72) Inventors: Perrine Peresse, San Mateo, CA (US); Shubhendu Sekhar Mukherjee, Southborough, MA (US); Krste Asanovic, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/747,399

(22) Filed: Jun. 18, 2024

(65) Prior Publication Data

US 2024/0338320 A1 Oct. 10, 2024

Related U.S. Application Data

(63) Continuation of application No. PCT/US2022/053686, filed on Dec. 21, 2022.

(60) Provisional application No. 63/293,075, filed on Dec. 22, 2021.

(51) Int. Cl.

| | |
|---|---|
| ***G06F 12/1009*** | (2016.01) |
| ***G06F 12/0882*** | (2016.01) |
| ***G06F 12/1045*** | (2016.01) |

(52) U.S. Cl.

CPC ...... *G06F 12/1009* (2013.01); *G06F 12/0882* (2013.01); *G06F 12/1063* (2013.01)

(58) Field of Classification Search

None

See application file for complete search history.

(56) References Cited

U.S. PATENT DOCUMENTS

| | | | | |
|---|---|---|---|---|
| 2007/0143565 A1* | 6/2007 | Corrigan | ............. | G06F 12/1036 711/202 |
| 2013/0326143 A1* | 12/2013 | Chen | .................. | G06F 12/1009 711/E12.024 |
| 2016/0140043 A1* | 5/2016 | Mukherjee | .......... | G06F 12/0808 711/123 |
| 2016/0140048 A1* | 5/2016 | Mukherjee | .......... | G06F 12/1027 711/135 |

(Continued)

FOREIGN PATENT DOCUMENTS

| | | |
|---|---|---|
| CN | 112860600 A | 5/2021 |

OTHER PUBLICATIONS

Florian Zaruba: "CVA6 Design Document: Memory Management Unit", Copyright 2017-2020. ETH Zurich and University of Bologna , 2020-present Open HW Group (retrieved from https://docs.openhwgroup.org/projects/cva6-user-manual/03_cva6_design/MMU.html). (Year: 2020).*

(Continued)

*Primary Examiner* — Yaima Rigol

(74) *Attorney, Agent, or Firm* — Kilpatrick Townsend & Stockton LLP

(57) ABSTRACT

Systems and methods are disclosed for page table entry caches with multiple tag lengths. For example, an integrated circuit (e.g., a processor) includes a page table walk circuitry including a page table entry cache, in which the page table walk circuitry is configured to access a multi-level page table, and in which a first entry of the page table entry cache combines a first number of multiple levels and a second entry of the page table entry cache combines a second number of multiple levels that is different from the first number of multiple levels.

16 Claims, 19 Drawing Sheets

(56) References Cited

U.S. PATENT DOCUMENTS

| | | | | |
|---|---|---|---|---|
| 2016/0224383 | A1* | 8/2016 | Bonzini | G06F 9/45558 |
| 2017/0308474 | A1* | 10/2017 | Hicks | G06F 9/3891 |
| 2019/0294551 | A1* | 9/2019 | Abhishek Raja | G06F 12/1027 |
| 2021/0064537 | A1* | 3/2021 | Speier | G06F 12/1027 |
| 2021/0173790 | A1* | 6/2021 | Kakaiya | G06F 12/063 |
| 2022/0374359 | A1* | 11/2022 | Yeung | G06F 12/0246 |
| 2022/0382474 | A1* | 12/2022 | Lim | G06F 3/0631 |
| 2023/0205709 | A1* | 6/2023 | Parker | G06F 12/1475 711/163 |

OTHER PUBLICATIONS

Gandhi et al., "Efficient Memory Virtualization", Available online at: URL:http:/research.cs.wisc.edu/multifacet/theses/jayneel_gandhi_phd.pdf, 2016, 175 pages.
PCT/US2022/053686 , "International Preliminary Report on Patentability", Jul. 4, 2024, 7 pages.
PCT/US2022/053686 , "International Search Report and Written Opinion", Apr. 21, 2023, 9 pages.

* cited by examiner

900

910

RECEIVE INVALIDATE COMMAND INCLUDING INDICATION OF TARGET PRIVILEGE LEVEL

920

RESPONSIVE TO INVALIDATE COMMAND, INVALIDATE ALL ENTRIES OF ADDRESS TRANSLATION BUFFER AND/OR PAGE TABLE ENTRY CACHE WITH TRANSLATION TAGS INDICATING THE TARGET PRIVILEGE LEVEL

1700

PAGE TABLE ENTRY CACHES WITH MULTIPLE TAG LENGTHS

CROSS-REFERENCES TO RELATED APPLICATIONS

This application is a continuation of International Application No. PCT/US2022/053686, filed Dec. 21, 2022, which claims priority to U.S. Provisional Application No. 63/293,075, filed Dec. 22, 2021, the entire contents of which are incorporated herein by reference for all purposes.

FIELD OF TECHNOLOGY

This disclosure relates to page table entry caches with multiple tag lengths.

BACKGROUND

An input/output memory management unit (IOMMU) is a memory management unit (MMU) that connects a direct memory access capable (DMA-capable) I/O bus to a main memory. Like a traditional MMU, which translates CPU-visible virtual addresses to physical addresses, the IOMMU maps device-visible virtual addresses, also called device addresses or I/O addresses, to physical addresses. Some units also provide memory protection from faulty or malicious devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
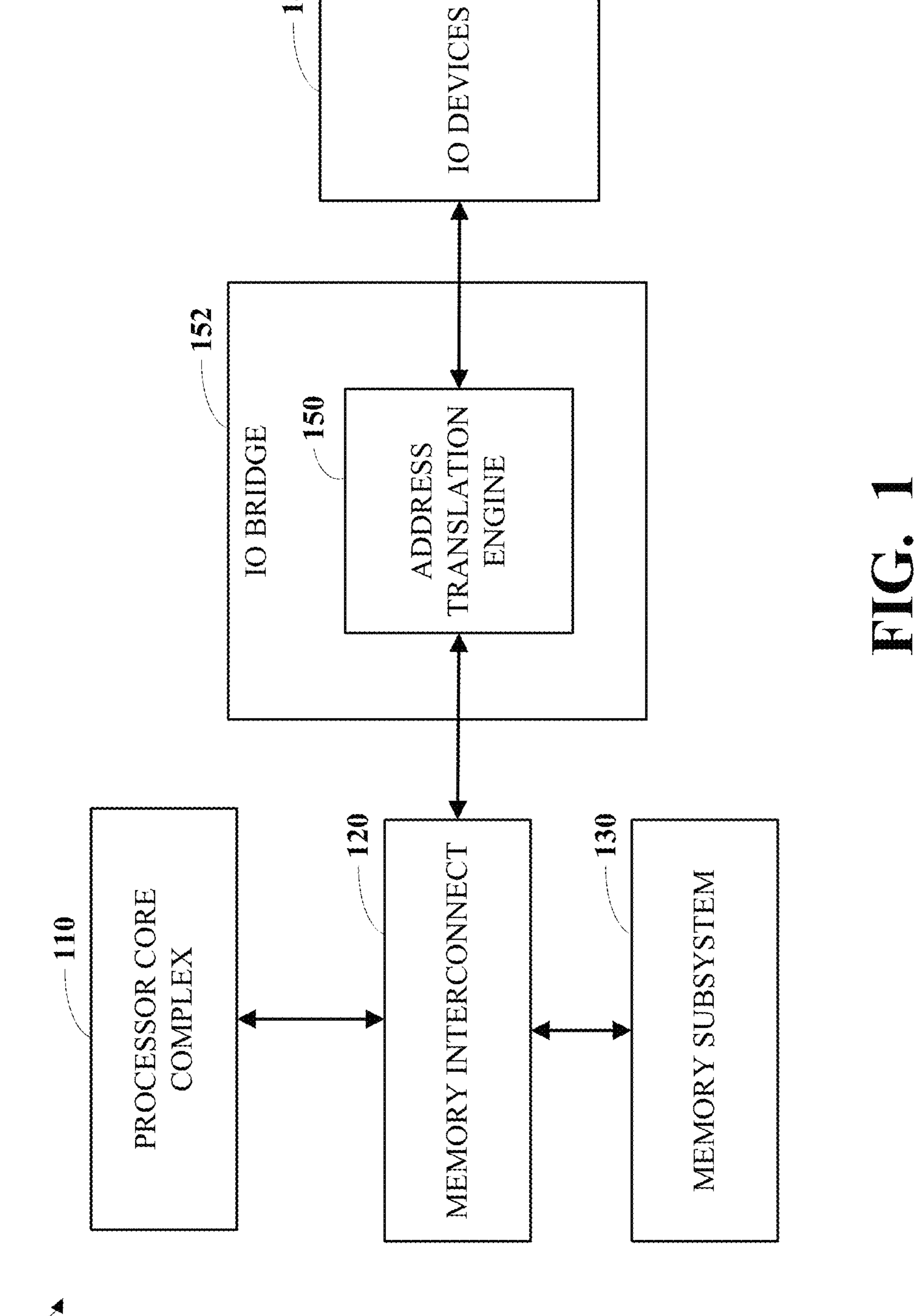
FIG. 1 is a block diagram of an example of a system for sharing memory with input/output devices, including an address translation engine for translating virtual addresses from various devices to physical addresses.

Systems and methods are described herein that may be used to implement translation tagging for address translation caching. An address translation engine is integrated in between an input/output (IO) device and a system interconnect. For example, an IO device can include graphics processing unit (GPU) for graphics, a storage controller, network interface controller (NIC), or IO accelerators, such as an encryption accelerator or a digital signal processor (DSP), which might have a direct memory access (DMA) interface to the system. The role of the address translation engine is to both translate device virtual addresses to physical addresses for device DMA requests and perform memory protection for such requests.

To perform address translations, the address translation engine may differentiate between the various kinds of address translations that can be used in the system to select the proper translation rules. To facilitate this, inbound requests are associated with a privilege level, a virtualization mode, and a translation mode. A translation request may include an input address, a read/write attribute, and a hardware identifier associated with the source of the request to identify relevant entries in a translation engine. For example, an address translation buffer (e.g., a translation lookaside buffer) may have entries that include a translation tag that indicates a privilege level, a virtualization mode, and a translation mode. For example, a page table entry cache of a page table walk circuitry may have entries that include a translation tag that indicates a privilege level, a virtualization mode, and a translation mode. A translation request may be augmented to include a translation tag that indicates the privilege level, the virtualization mode, and the translation mode of the request. This translation tag may then be used to find relevant data for the address translation request in structures of the address translation engine (e.g., an address translation cache) and facilitate the translation of the input address of the request.

The virtualization mode may be a binary parameter indicating whether an address translation request is being made by a virtual machine running in the system. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode.

Some implementations may provide advantages over conventional systems for address translation, such as, for example, reducing the size of an address translation buffer (e.g., an address translation cache or translation lookaside buffer) needed to efficiently support a variety of address translation types in a complex system that support multi-stage address translation for virtual machines, and/or increasing the speed/performance of an address translation engine in some conditions.

As used herein, the term “circuitry” refers to an arrangement of electronic components (e.g., transistors, resistors, capacitors, and/or inductors) that is structured to implement one or more functions. For example, a circuit may include one or more transistors interconnected to form logic gates that collectively implement a logical function.

FIG. 1 is a block diagram of an example of a system 100 for sharing memory with input/output devices 140, including an address translation engine 150 for translating virtual addresses from various devices to physical addresses. The system 100 includes a processor core complex 110, a memory interconnect 120, and a memory subsystem 130. The system 100 also includes one or more input/output devices 140 that access the memory subsystem 130 using the address translation engine 150, which is part of an input/output bridge 152.

The address translation engine 150 is integrated in between an IO device 140 and the system interconnect 120. For example, the input/output devices 140 may include a GPU for graphics, a storage controller, a NIC, and/or IO accelerators, such as an encryption accelerator or DSPs, which might have a DMA interface to memory of the system 100. A purpose of the address translation engine 150 is to both translate device virtual addresses to physical addresses for device DMA requests and to perform memory protection for such requests.

For example, the address translation engine 150 may be used to facilitate DMA traffic from the input/output devices 140. The address translation engine 150 may be integrated in an IO bridge 152 or shell in order to comply with requirements of a system on a chip (SOC). The role of this IO bridge 152 may differ from SOC to SOC but it may have to handle request reordering, error handling, and/or specific attribute management.

In an example, a device DMA requests to the memory subsystem 130, which may be referred to as inbound transactions, can be processed by the address translation engine 150. In some implementations, outbound transactions, from the processor core complex 110 to the input/output devices 140, are not managed by the address translation engine 150, as the address of the transaction is already physical (e.g., as translated by the hart's memory management unit (MMU)). For the address translation engine 150 to perform address translations, it may differentiate between the various IO devices 140 to select the proper translation rules. Inbound requests may then have a hardware context identifier along with the request (address, read/write, attribute) to identify a translation entry. The hardware context identifier may be unique for a device (or a process within the device). In some implementations, each IO device can provide several hardware context identifiers to the address translation engine 150 based on the transaction, but one hardware context identifier can be associated with only one device. An inbound address translation request may be associated with a privilege level, a virtualization mode, and a translation mode, which can be indicated a translation tag that can be used to efficiently associate data of an address translation engine used to implement the various kinds of address translations supported by the system.

The address translation engine 150 may include a mechanism to associate a software process with a hardware context identifier. This may be achieved by binding a software context identifier to a hardware context identifier using a context identifier table. A software context identifier may be a representation of a software process (e.g., using an address-space identifier (ASID)). A single address translation engine may be used to perform address translation from one device or several devices. There may also be several address translation engine instances in an SOC with each one translating addresses for a set of IO devices. For example, the address translation engine 150 may be the address translation engine 300 of FIG. 3.

Figure 2:
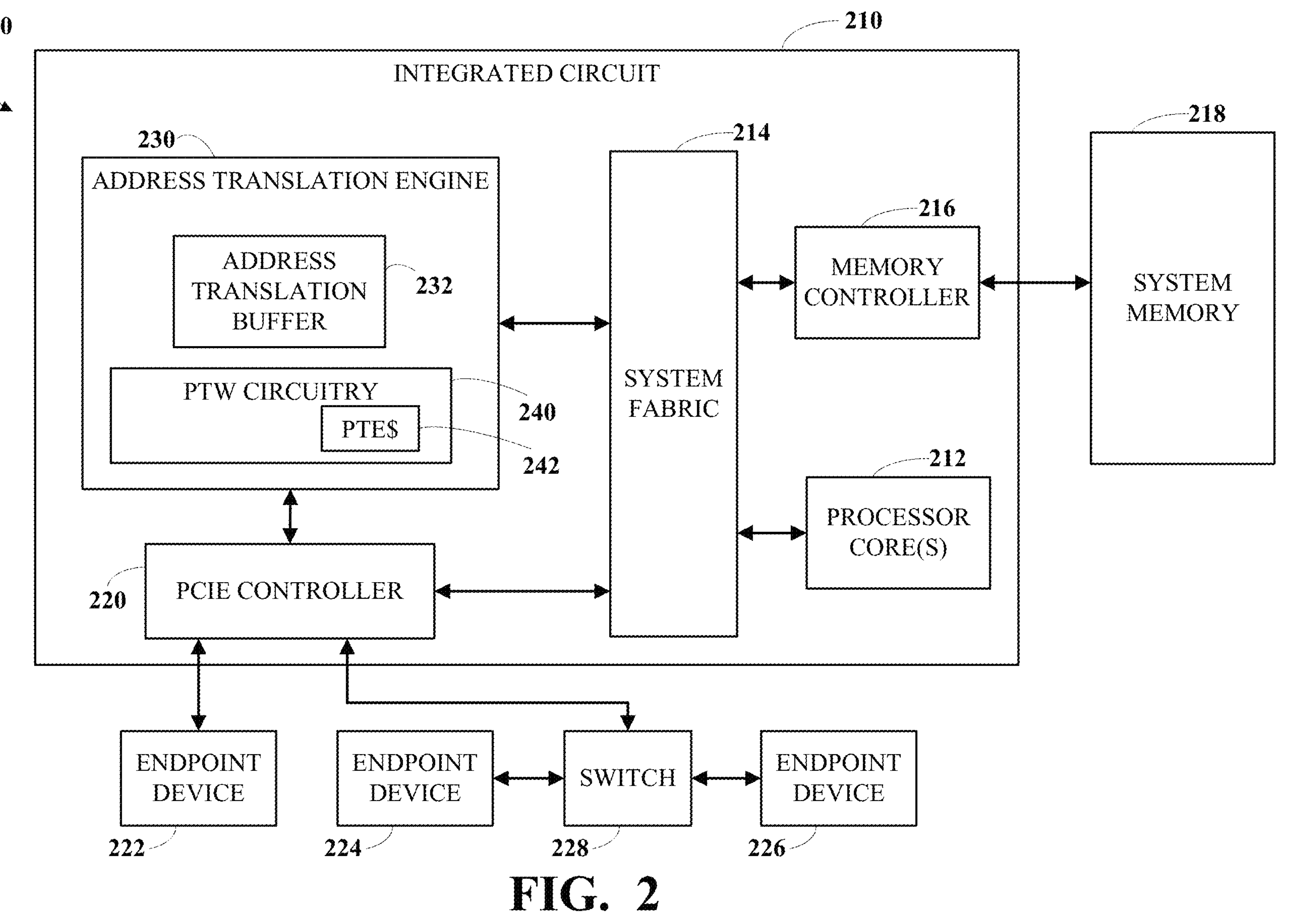
FIG. 2 is a block diagram of an example of a system for sharing memory with devices connected to an integrated circuit by a bus, including an address translation engine that includes an address translation buffer and a page table walk circuitry for translating virtual addresses to physical addresses.

FIG. 2 is a block diagram of an example of a system 200 for sharing memory with devices connected to an integrated circuit 210 by a bus, including an address translation engine 230 that includes an address translation buffer 232 and a page table walk circuitry 240 for translating virtual addresses to physical addresses. In this example, the system 200 is a Peripheral Component Interconnect Express (PCIe) system that connects components via a PCIe bus. The system 200 includes an integrated circuit 210 for executing instructions, a system memory 218, and endpoint devices (222, 224, and 226), some of which are connected to the integrated circuit 210 via a switch 228. The integrated circuit 210 includes one or more processor cores 212, a system fabric 214, a memory controller 216 for interfacing to the system memory 218, a PCIe controller 220 for interfacing to devices via PCIe bus, and an address translation engine 230 (e.g., the address translation engine 300 of FIG. 3) for translating virtual addresses used by endpoint devices (222, 224, and 226) to physical addresses of the system memory 218. The address translation engine 230 includes an address translation buffer 232 (e.g., a translation lookaside buffer (TLB)) and a page table walk circuitry 240 including a page table entry cache 242 that stores partial results page table walks to increase the speed of address translation in the system 200. For example, the address translation buffer 232 may be the address translation buffer 310 of FIG. 3. For example, the system 200 may be used to implement the process 700 of FIG. 7, the process 800 of FIG. 8, the process 900 of FIG. 9, the process 1000 of FIG. 10, the process 1500 of FIG. 15 and/or the process 1600 of FIG. 16.

The integrated circuit 210 includes an address translation buffer 232. An entry of the address translation buffer 232 includes a translation tag that indicates a privilege level, a virtualization mode, and a translation mode. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode. The tag may also include a field storing a context identifier. For example, the address translation buffer 232 may be a translation lookaside buffer. In some implementations, the address translation buffer 232 is part of a two-level address translation cache. The entries of the address translation buffer 232 may be tagged with a context identifier (e.g., a software context identifier) and a virtual address. A complete context identifier may be used to tag a VS-stage or nested translation and an upper portion of the context identifier may be used to tag a G-stage translation. There may be several entries in the address translation buffer 232 with the same virtual address but different context identifier, or even with the same virtual address and context identifier but different privilege levels. In some implementations, the address translation buffer 232 is not tagged with the hardware identifiers as multiple IO devices can use the same translation rules and be assigned to the same software context. However, a software context may be uniquely identified by a privilege level and a context identifier. For example, the address translation buffer 232 may be the address translation buffer 400 of FIG. 4.

For example, an input address translation request is part of a direct memory access request. In some implementations, the input address translation request may be received via a PCIe bus from an external device. For example, the input address translation request may be received from an endpoint device (222, 224, or 226) via the PCIe controller 220. For example, the input address translation request may be received by the address translation engine 230.

The integrated circuit 210 includes a page table walk circuitry 240 including a page table entry cache 242. An entry of the page table entry cache 242 includes a translation tag that indicates a privilege level, a virtualization mode, and a translation mode. For example, the privilege level may be from a set of privilege levels including a machine privilege level and a supervisor privilege level. For example, the translation mode may be from a set of translation modes including a single-stage translation mode, a G-stage only mode, a VS-stage only mode, and nested translation mode. The data stored by entry of the page table entry cache 242 may include a physical address of a page table in a multi-level page table that represents a partial result of a page table walk. For example, the page table walk circuitry 240 may be the page table walk circuitry 500 of FIG. 5.

An entry of the array of the page table entry cache 242 may include various information specifying how the address translation engine 230 is to perform an address translation. For example, an entry of the page table entry cache 242 may include a context identifier (e.g., a software context identifier; a valid flag; and/or a physical page number (PPN) (e.g., a 4KiB PPN for single-stage or G-stage only translations). The translation tag may be part of the tags for entries in the address translation buffer 232 and may be used by the address translation buffer 232 and/or other components of the address translation engine 230 to perform a requested address translation. The translation tag may also be part of the tags for entries in the page table entry cache 242.

Note, although not shown in FIG. 2, the integrated circuit 210 may have several PCIe Controllers handled by the single address translation engine 230. The hardware identifier provided to address translation engine 230 may be constructed such that each endpoint device has a unique identifier (e.g., a most significant bit of a hardware identifier could be the Root Segment ID).

Figure 3:
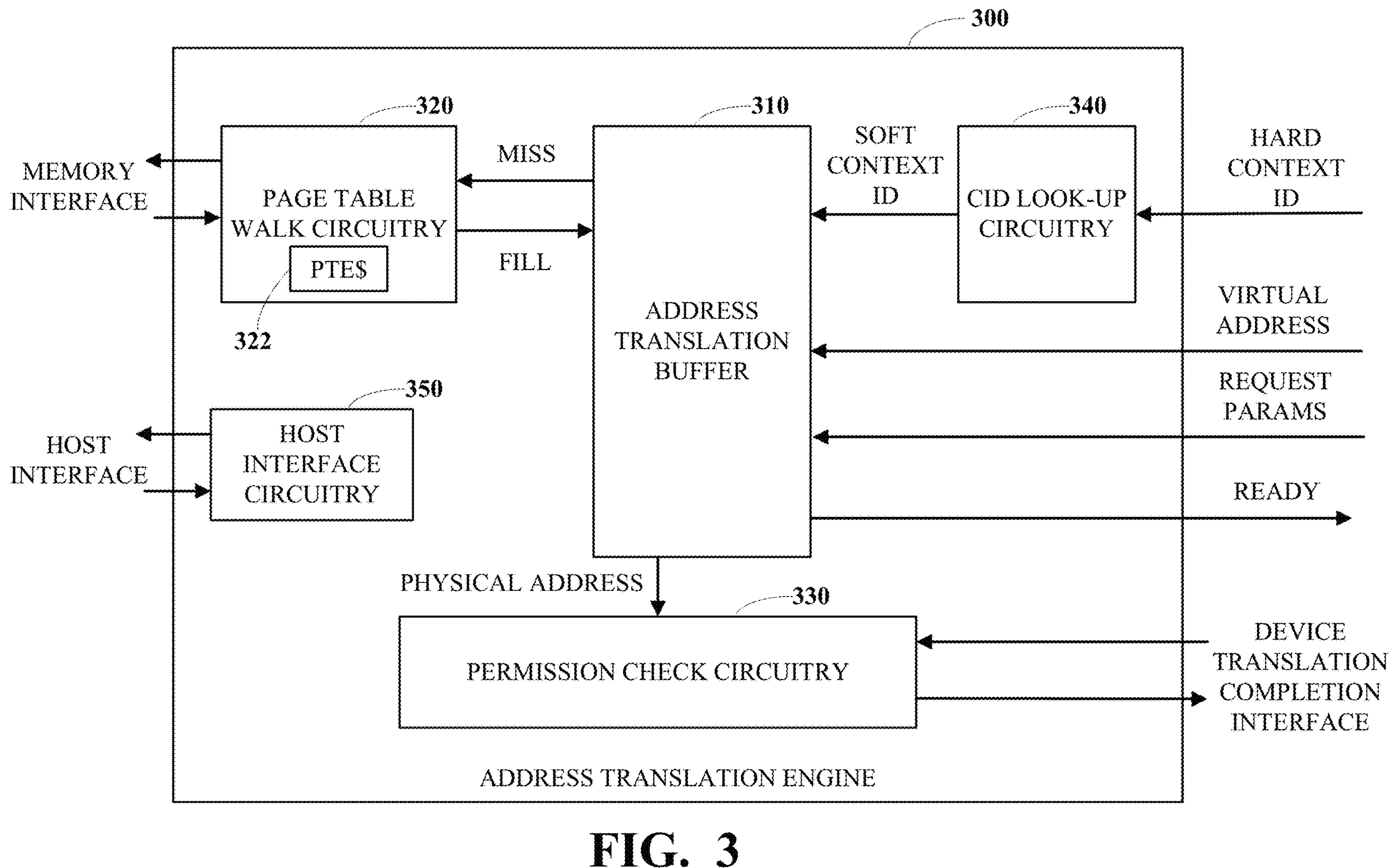
FIG. 3 is a block diagram of an example of an address translation engine for mapping virtual addresses from various devices to physical addresses of a memory system, which includes an address translation buffer and a page table walk circuitry with a page table entry cache with tags that include an indication of a privilege level, a virtualization mode, and a translation mode.

FIG. 3 is a block diagram of an example of an address translation engine 300 for mapping virtual addresses from various devices to physical addresses of a memory system. The address translation engine 300 may located in an integrated circuit (e.g., an SOC) close to the devices that it provides address translation for. The role of the address translation engine 300 is to intercept the device address transaction to system memory and perform the required address translation using its address translation buffer 310 (e.g., including one or more TLBs). If the address translation buffer 310 does not have the requested information, the address translation engine 300 performs a page table walk using the page table walk circuitry 320 through an interface to system memory via a bus (e.g., a system interconnect). The address translation engine 300 may manage the command queues and error record queues to interface with software. The address translation engine 300 may also implement a hardware performance monitor. The address translation engine 300 includes an address translation buffer 310, a page table walk circuitry 320 including a page table entry cache 322, a permission check circuitry 330, a context identifier look-up circuitry 340, and a host interface circuitry 350. For example, address translation engine 300 may be used to implement the process 700 of FIG. 7, the process 800 of FIG. 8, the process 900 of FIG. 9, the process 1000 of FIG. 10, the process 1500 of FIG. 15 and/or the process 1600 of FIG. 16.

The address translation engine 300 includes an address translation buffer 310. For example, the address translation buffer 310 may be a translation lookaside buffer. In some implementations, the address translation buffer 310 is part of a two-level address translation cache. For example, the address translation buffer 310 may include a small and fast LITLB and a larger L2TLB. On TLB hit, the translated address and permissions may be sent to the permission check circuitry 330 via a hit queue, whereas L2TLB misses are sent to the page table walk circuitry 320. The address translation buffer 310 may be fully-associative or set-associative with a configurable number of entries. For example, the replacement policy of the address translation buffer 310 may be Pseudo-LRU (Pseudo Least Recently Used). In some implementations, the address translation buffer 310 stores the page translations in registers using a vector of reg elements which create an array of registers that output a copy of the input signal delayed by one clock cycle, depending on its activation signal. The address translation buffer 310 may respond with a hit/miss indication on the next clock cycle and store virtual-to-physical page translations (e.g., for 4 KB pages or 2 MB/1 GB/512 GB super pages). For example, the address translation buffer 310 may be implemented using content addressable memory (CAM) or static random access memory (SRAM). An entry of the address translation buffer 310 includes a tag including a field storing a context identifier (e.g., a software context identifier), which may be shared by multiple hardware devices. The tag of the entry may also include a virtual address and a translation tag that indicates a privilege level, a virtualization mode, and a translation mode. For example, the privilege level may be from a set of privilege levels including a machine privilege level and a supervisor privilege level. For example, the translation mode may be from a set of translation modes including a single-stage translation mode, a G-stage only mode, a VS-stage only mode, and nested translation mode. An entry of the address translation buffer 310 includes data including a physical address and permission data (e.g., including a read permission flag, a write permission flag, and an execute permission flag).

The address translation engine 300 includes a page table walk circuitry 320 that is configured to perform page table walks to determine address translations in response to cache misses in the address translation buffer 310. For example, the page table walk circuitry 320 may include parallel page table walker instances, which share a page table entry cache 322 for non-leaf page tables. An entry of the page table entry cache 322 may include a translation tag that indicates a privilege level, a virtualization mode, and a translation mode. The page table walk circuitry 320 may be configured to access page tables stored in system memory (e.g., the system memory 218) using a memory interface to the system interconnect.

The address translation engine 300 includes a permission check circuitry 330 that receives translated physical addresses from the address translation buffer 310. The permission check circuitry 330 may include an arbiter to get translated requests from page table walker response queues. It performs the permission checks and sends responses to the requesting hardware device via a device translation completion interface (e.g., via a PCIe bus master interface). In case of violation, the permission check circuitry 330 may also write an error record into an appropriate error record queue.

The address translation engine 300 includes a context identifier look-up circuitry 340. The context identifier look-up circuitry 340 maps a hardware identifier to a context identifier (e.g., a software context identifier), which may be associated with multiple hardware devices to facilitate sharing of address translation context between devices. The context identifier look-up circuitry 340 stores context identifiers in an array that is indexed by a hardware identifier. The context identifier look-up circuitry 340 may be configured to receive an input address translation request including a first hardware identifier value; generate an output address translation request, including a first context identifier value that is stored in an entry of the array indexed by the first hardware identifier value; and apply the output address translation request to the address translation buffer 310. The address translation buffer 310 may return a physical address in response to the output address translation request, which may be transmitted (by the permission check circuitry 330) in response to the input address translation request. In some implementations, the input address translation request is part of a direct memory access request. For example, the input address translation request may be received via a device translation request interface, which may be a slave interface and a valid/ready type of interface.

In some implementations, the array is implemented as a single-level table and all entries of the array are stored in a data store of the context identifier look-up circuitry 340. For example, the context identifier look-up circuitry 340 may have 2^n entries, where n is the width in bits of the hardware identifiers. In an example, the array of the context identifier look-up circuitry 340 may have 256 entries which are stored locally. In some implementations, the array is implemented as a multi-level table and at least some entries of the array are stored in a memory that is accessed by the context identifier look-up circuitry 340 via a bus. For example, the context identifier look-up circuitry 340 may include a data store that stores a first level of the multi-level table with entries that include a pointer to a next level of the multi-level table. For example, the context identifier look-up circuitry 340 may store some levels of the multi-level table in system memory.

An entry of the array of the context identifier look-up circuitry 340 may include various information specifying how the address translation engine 230 is to perform an address translation. For example, an entry of the array may include a context identifier (e.g., a software context identifier; a valid flag; and/or a PPN (e.g., a 4KiB PPN for single-stage or G-stage only translations). In some implementations, the entry of the array indexed by the first hardware identifier value includes a translation tag that indicates a privilege level, a virtualization mode, and a translation mode, and the translation tag is included in the output address translation request. For example, the privilege level may be from a set of privilege levels including a machine privilege level and a supervisor privilege level. For example, the translation mode may be from a set of translation modes including a single-stage translation mode, a G-stage only mode, a VS-stage only mode, and nested translation mode. The translation tag may be part of the tags for entries in the address translation buffer 310 and/or in the page table entry cache 322 and may be used by the address translation buffer 310 and/or the page table walk circuitry 320 to perform a requested address translation. The context identifier look-up circuitry 340 may be configured to provide the entry of the array indexed by the first hardware identifier value along with the translation request to the address translation buffer 310.

The address translation engine 300 includes a host interface circuitry 350. The host interface circuitry 350 enables a host to configure and maintain the address translation engine 300, including writing to the array of the context identifier look-up circuitry 340. The host interface circuitry 350 may output error records, system performance data, and/or debug data. For example, the host interface circuitry 350 may implement command queues and error record queues. The host interface circuitry 350 may include a slave interface to the system interconnect.

Figure 4:
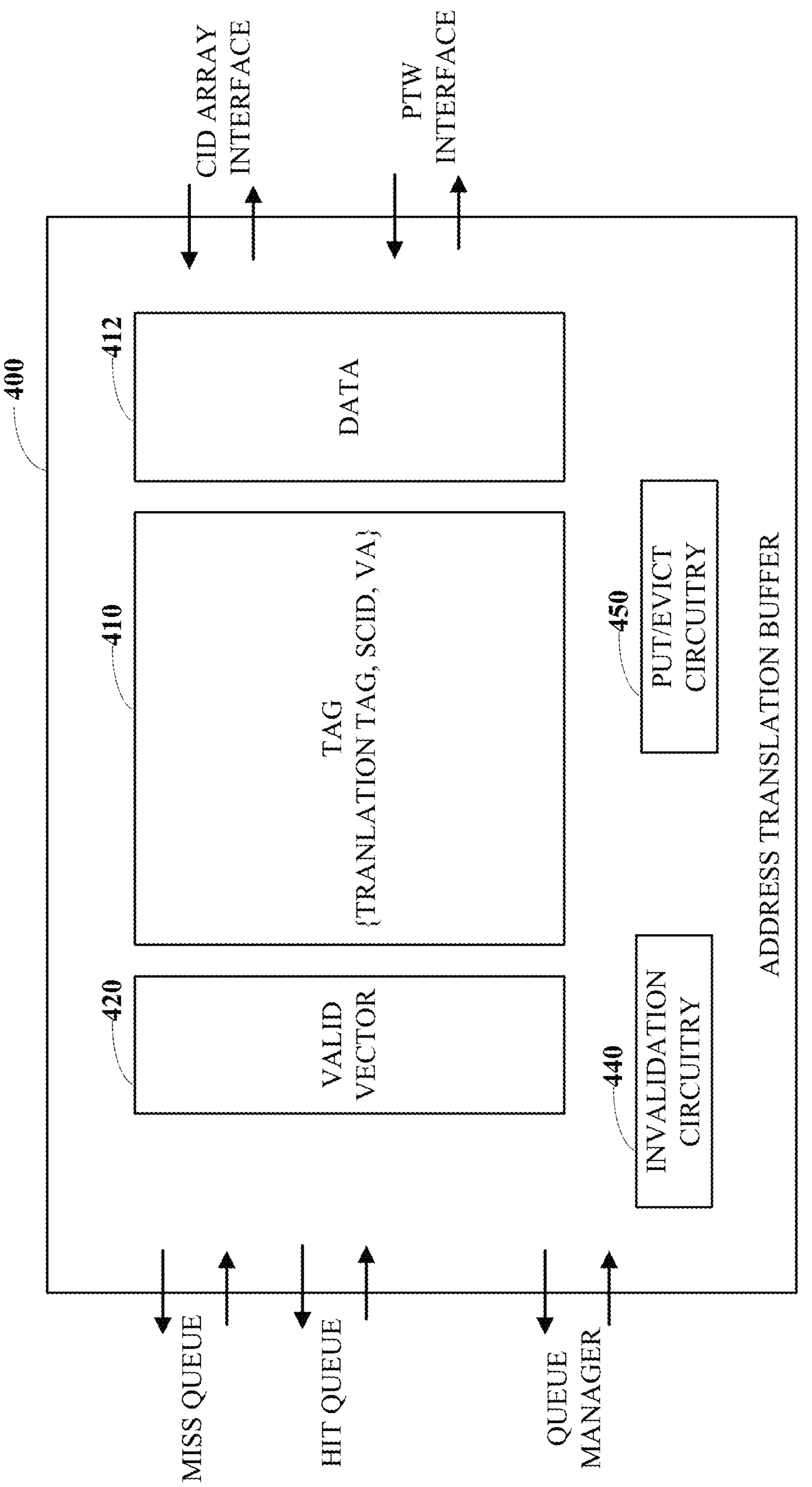
FIG. 4 is a block diagram of an example of an address translation buffer using translation tags that indicate of a privilege level, a virtualization mode, and a translation mode.

FIG. 4 is a block diagram of an example of an address translation buffer 400 using translation tags that indicate of a privilege level, a virtualization mode, and a translation mode. The address translation buffer 400 includes a tag array 410 (e.g., a table) storing data for respective entries of the address translation buffer 400, a corresponding data array 412 storing data for respective entries of the address translation buffer 400, a valid vector 420 storing valid flags for respective entries of the address translation buffer 400, invalidation circuitry 440, and a put/evict circuitry 450. For example, the address translation buffer 400 may be used to implement the process 700 of FIG. 7 and/or the process 900 of FIG. 9.

The address translation buffer 400 may be similar to a processor core's TLB. The number of entries in the cache may be parametrizable and the tags 410 may be different from those of a core. The address translation buffer 400 may compare incoming translation requests with a virtual address to physical entries stored in the address translation buffer 400. The address translation buffer 400 may be small and very fast. The address translation buffer 400 may be fully associative with a configurable number of entries. For example, the replacement policy may be Pseudo-LRU (Pseudo Least Recently Used).

For example, the address translation buffer 400 may store the page translations in registers using a vector of Reg elements which create an array of registers that output a copy of the input signal delayed by one clock cycle, depending on its activation signal. The address translation buffer 400 may respond with a hit/miss indication on the next cycle and may store virtual-to-physical page translations of 4 KB pages but also 2 MB/1 GB/512 GB super pages.

The address translation buffer 400 may handle regular 4 KB pages in a sectored cache which has a configurable number of entries. The number of sectors may be fixed (e.g., to 4 sectors). The sector may be addressed by the lower bits (e.g., the lower 2 bits) of the virtual address without the 12-bit offset. Each sector may be fully associative. In an example, each entry may include a tag 410, data 412, a valid flag 420 as described below:

Tag={Trans Tag [1:0], SCID [SCIDWidth-1:0], VA[VAS-12:2]}

For example, the data 412 of an entry may include a physical address and permission flags:

Data={PA [PAS−12], r, w, x}

The address translation buffer 400 may be configured to handle the various pages size supported by the SvN paging scheme. In some implementations (not shown in FIG. 4), an entry of the address translation buffer 400 may also store the level in the tree, which may be equivalent to the page size. With the level information, the tag comparison may be adapted to the appropriate number of address bits.

An address translation request may be received via a context identifier array interface. An address translation request may include providing a tag of the translation request along with a translation mode extracted from an entry of the context identifier array. In case of bypass or global bypass translation mode, there is no comparison required and the result is a hit with the appropriate bypass flag. The result of a comparison is sent either to the hit queue or the miss fifos. These small queues are used to interface with the next modules either the permission check module or a page table walk circuitry (e.g., the page table walk circuitry 500 of FIG. 5) respectively.

Write (or refill) of the address translation buffer 400 may be based on response from a page table walk circuitry via a page table walk interface. For example, a Pseudo-LRU (e.g., binary tree style: nWays-1 bits per set) may be used per sector by the put/evict circuitry 450 to determine which entry to evict when a refill is requested. Once write to the address translation buffer 400 is performed, the address translation buffer 400 may respond with an acknowledge.

A variety of invalidation options may be supported by the invalidation circuitry 440. The invalidation circuitry 440 may support invalidation per matching:

Trans Tag (command CMD_INV_TRANS_PRIV)

TransTag.SCID (command CMD_INV_TRANS_PRIV_SCID)

Trans Tag.SCID.VA (command CMD_INV_TRANS_PRIV_SCID_VA)

The result of the invalidation may be to set the valid flag of the hit entry to zero.

For example, the address translation buffer 400 may implement a set-associative cache using a Pseudo LRU replacement policy. In some implementations, CAMs or SRAMs are used to implement the address translation buffer 400.

The size of the address translation buffer 400 may vary (e.g., 128, 256, 512, 1024, 2048, or 4096 entries). The address translation buffer 400 may be a set-associative cache and may support multiple ways (e.g., 4 or 8 ways).

Figure 5:
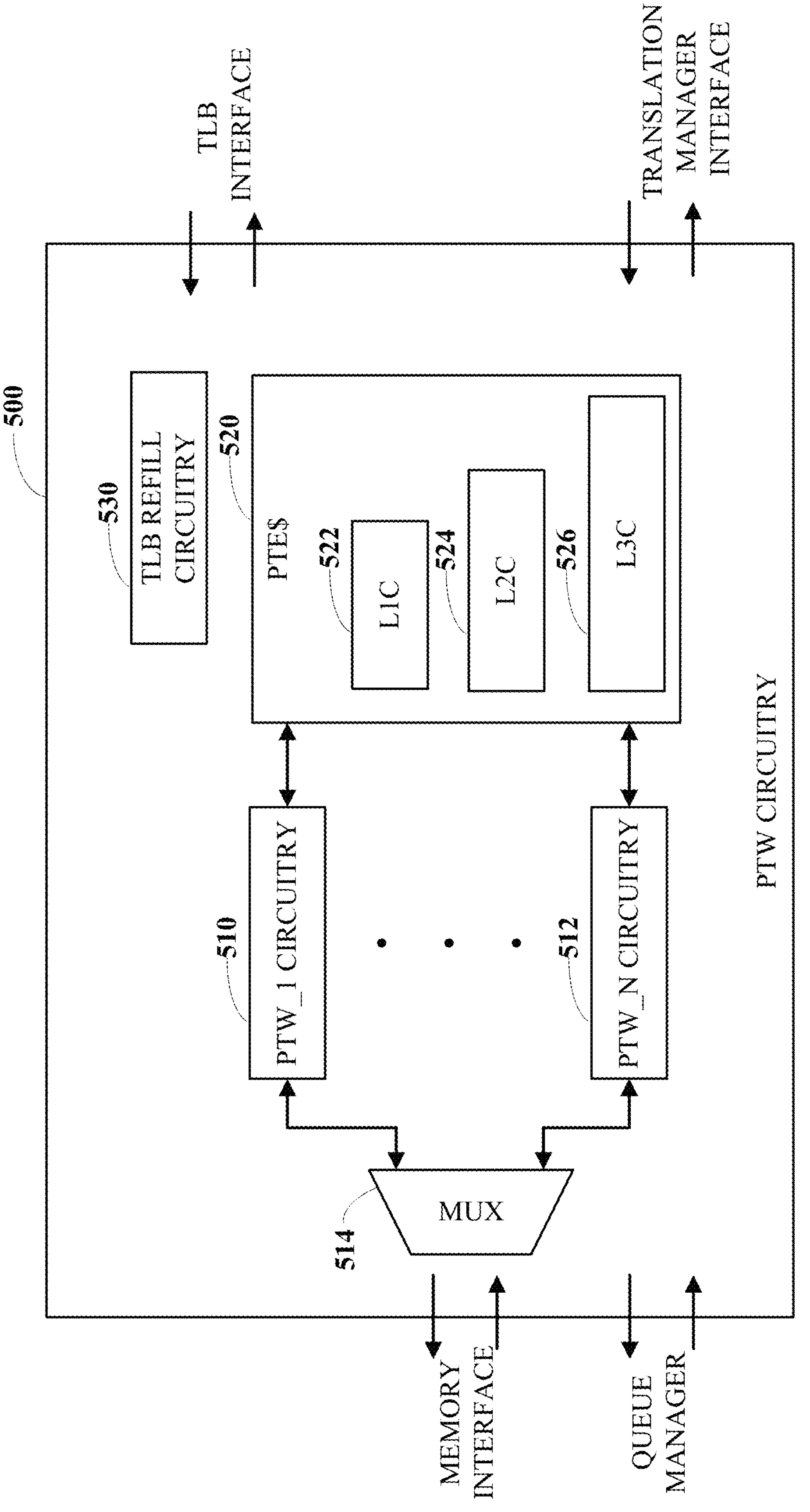
FIG. 5 is a block diagram of an example of a page table walker circuitry including a page table entry cache using translation tags that indicate of a privilege level, a virtualization mode, and a translation mode.

FIG. 5 is a block diagram of an example of a page table walk circuitry 500 including a page table entry cache 520 using translation tags that indicate of a privilege level, a virtualization mode, and a translation mode. The page table walk circuitry 500 includes a set of page table walk state machine circuitries (510 through 512) that are configured to perform page table walks in parallel using the memory system interface that they share using a multiplexer 514. The page table walk state machine circuitries (510 through 512) can also retrieve partial page table walk results in the form of physical address of intermediate page tables from the page table entry cache 520. The page table entry cache 520 includes subsets (522, 524, and 526) with different tag sizes corresponding to different depths in a multi-level page table walk. The page table walk circuitry 500 includes a TLB refill circuitry for sending a physical address found by a page table walk to a TLB that requested the page table walk for storage in the TLB. For example, the page table walk circuitry 500 may be used to implement the process 800 of FIG. 8, the process 900 of FIG. 9, the process 1000 of FIG. 10, the process 1500 of FIG. 15 and/or the process 1600 of FIG. 16.

In this example, the page table walk circuitry 500 includes two or more page table walk state machine circuitries (510 through 512) and a shared page table entry cache 520. The page table entry cache 520 may be a small fully associative cache that stores the non-leaf virtual-to-physical page translations. A page table walk state machine circuitry (510 through 512) may interface with a translation manager to receive requests and send results of translation. The page table walk circuitry 500 may also interface with a TLB for the cache refill. The page table walk circuitry 500 may check endian to properly interpret a page table entry stored in system memory.

The page table entry cache 520 can be implemented in various ways, such as unified versus split, and physically tagged or virtually tagged. The page table walk circuitry 500 may be configured to access a multi-level page table, an entry of the page table entry cache 520 may combine a first number of multiple levels and a second entry of the page table entry cache 520 combines a second number of multiple levels that is different from the first number of multiple levels (e.g., 2 levels combined in an entry of the L2C subset 524 and 3 levels combined in an entry of the L3C subset 526). For example, the tag of the first entry of the page table entry cache 520 may have different length (e.g., 30 bits versus 39 bits) than the tag of the second entry of the page table entry cache 520. In this example, the subsets of the page table entry cache 520 have the following formats:

The L1C subset 522 has tags of the format: {TransTag [1:0], SCID [SCIDWidth−1:0], VPN_L1}, The L2C subset 524 has tags of the format: {TransTag [1:0], SCID [SCIDWidth−1:0], VPN_L1, VPN_L2}, The L3C subset 526 has tags of the format: {Trans Tag [1:0], SCID [SCIDWidth−1:0], VPN_L1, VPN_L2, VPN_L3}, where TransTag is a translation tag that indicates of a privilege level, a virtualization mode, and a translation mode; SCID is a context identifier indicating one or more hardware sources a translation request; and VPN_Ln is virtual page number from the virtual address being translated that is used to index a table of a multi-level page table at depth n. For example, the privilege level may be from a set of privilege levels including a machine privilege level and a supervisor privilege level. For example, the translation mode may be from a set of translation modes including a single-stage translation mode, a G-stage only mode, a VS-stage only mode, and nested translation mode. The data for an entry of the page table entry cache 520 may be a physical page number that points to the next table of the multi-level page table. The L1C subset 522, the L2C subset 524, and the L3C subset 526 may be fully associative caches, and each may have its own P-LRU replacement policy. For example, the page table walk circuitry 500 may implement the caching scheme 600 described in relation to FIG. 6.

The TLB refill circuitry 530 may implement refill logic. For example, once a complete translation is performed, the resulting physical address, permissions and access exception may be sent to a translation manager via the translation manager interface. When no access exception happened, a TLB refill request may also be sent to one or more levels of an address translation buffer (e.g., the address translation buffer 400).

The page table walk circuitry 500 may also implement various invalidation options:

TransTag (command CMD_INV_TRANS_PRIV)

Trans Tag. SCID (command CMD_INV_TRANS_PRIV_SCID)

Trans Tag. SCID. VA (command CMD_INV_TRANS_PRIV_SCID_VA)

Each subset of the page table entry cache 520 may be invalidated per an invalidation command.

Figure 6:
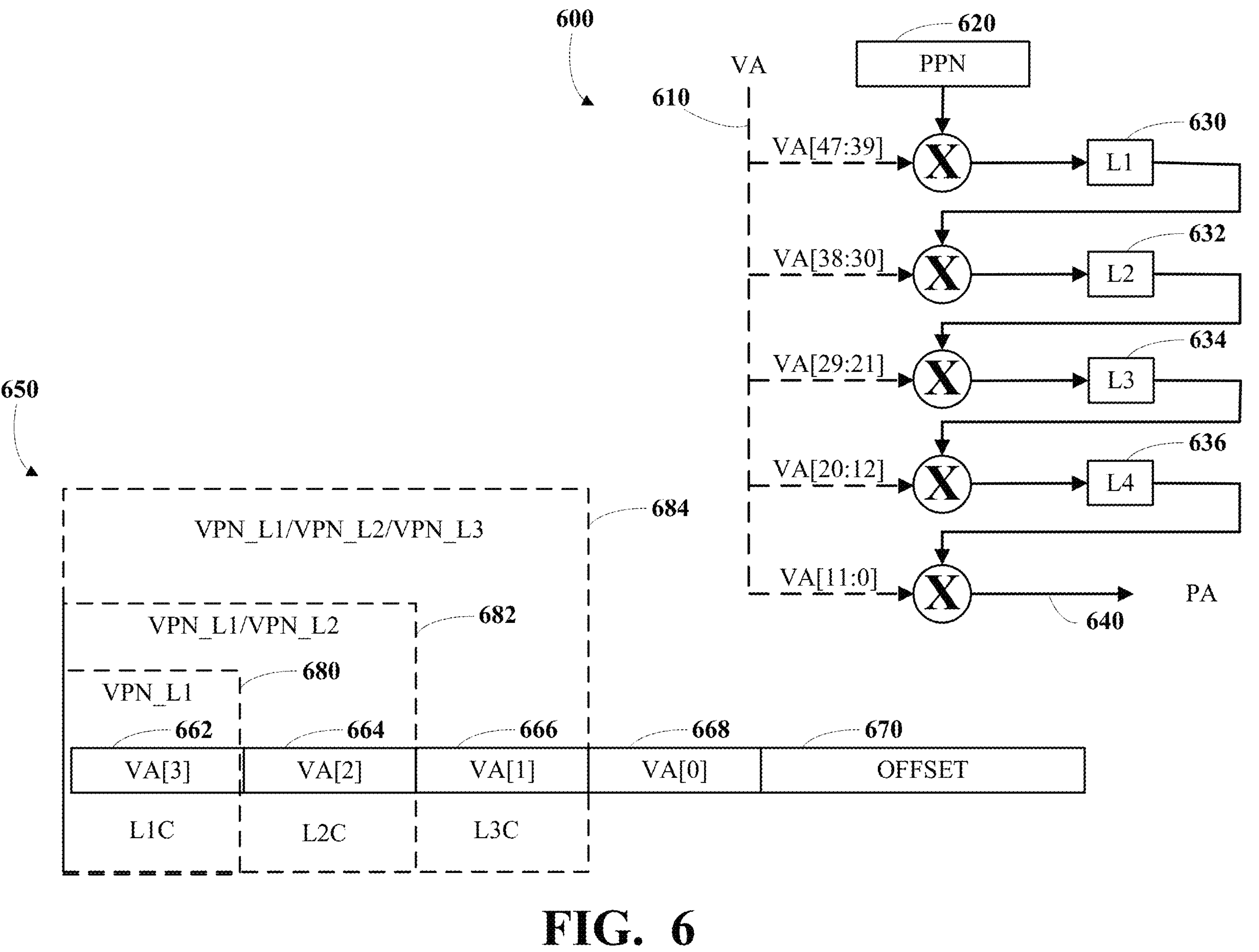
FIG. 6 is an illustration of an example of a caching scheme for page table walks of a multi-level page table.

FIG. 6 is an illustration of an example of a caching scheme 600 for page table walks of a multi-level page table. A virtual address 610 of an address translation request is partitioned into four virtual page numbers (e.g., VA[47:39], VA[38:30], VA[29:21], and VA[20:12]) that are used to index respective tables in a multi-level page to perform page table walk for a single stage address translation to obtain a physical address 640. The physical page number 620 points to the first level table 630 in memory, which is indexed using a first virtual page number (VA[47-39]) to obtain a physical page number pointing to the second level table 632. The second level table 632 is indexed using a second virtual page number (VA[38-30]) to obtain a physical page number pointing to the third level table 634. The third level table 634 is indexed using a third virtual page number (VA[29-21]) to obtain a physical page number pointing to the fourth level table 636. The fourth level table 636 is indexed using a fourth virtual page number (VA[20-12]) to obtain a physical page number pointing to the page in memory corresponding the virtual address 610. This page in memory is combined with an offset of the virtual address (VA[11:0]) to obtain the physical address 640 that results from the translation.

The memory map 650 illustrates a virtual address format with correspondence to subsets of a page table entry cache (e.g., the page table entry cache 520). The virtual address is partitioned into a first virtual page number 662, a second virtual page number 664, a third virtual page number 666, a fourth virtual page number 668, and an offset 670. A first subset 680 (L1C) of a page table entry cache stores a physical page number retrieved from the first level table 630 in memory and an entry of the first subset 680 has a tag that includes the first virtual page number 662. A second subset 682 (L2C) of a page table entry cache stores a physical page number retrieved from the second level table 632 in memory and an entry of the second subset 682 has a tag that includes the first virtual page number 662 and the second virtual page number 664. A third subset 684 (L3C) of a page table entry cache stores a physical page number retrieved from the third level table 634 in memory and an entry of the third subset 684 has a tag that includes the first virtual page number 662, the second virtual page number 664, and the third virtual page number 666.

Figure 7:
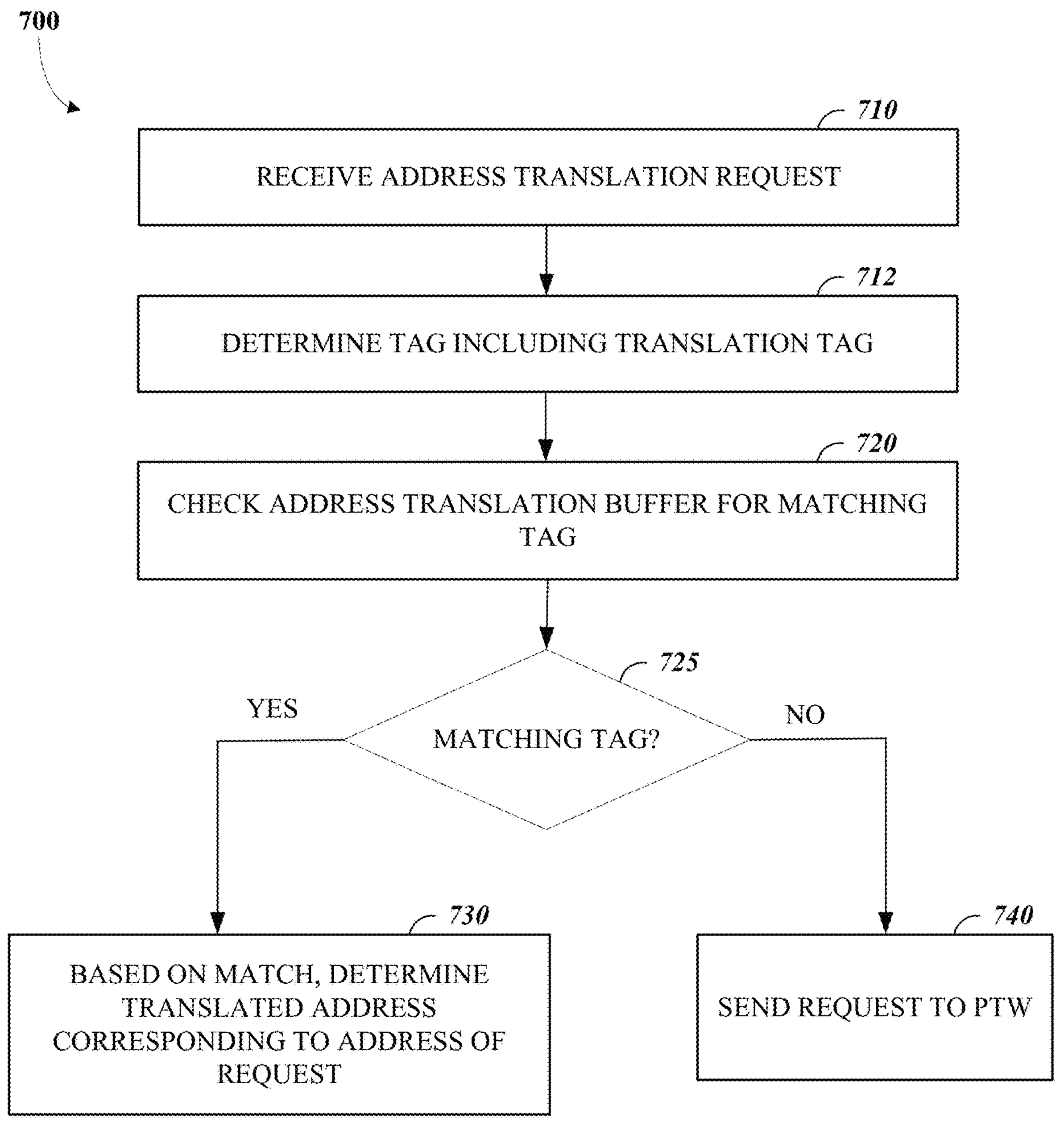
FIG. 7 is a flow chart of an example of a process for using an address translation buffer with tags that include an indication of a privilege level, a virtualization mode, and a translation mode.

FIG. 7 is a flow chart of an example of a process 700 for using an address translation buffer with tags that include an indication of a privilege level, a virtualization mode, and a translation mode. The process 700 includes receiving 710 an address translation request associated with a privilege level, a virtualization mode, and a translation mode; determining 712 a first tag including a translation tag that indicates the privilege level, the virtualization mode, and the translation mode; and checking 720 an address translation buffer for presence an entry with a tag matching the first tag. If (at 725) there is a matching tag, then the process 700 includes, based on a match with the first tag, determining 730 a translated address corresponding to an address of the address translation request. If (at 725) there is no matching tag, then the process 700 includes, sending 740 the address translation request to a page table walk circuitry to obtain a translated address. For example, the process 700 may be implemented using the system 100 of FIG. 1. For example, the process 700 may be implemented using the integrated circuit 210 of FIG. 2. For example, the process 700 may be implemented using the address translation engine 300 of FIG. 3. For example, the process 700 may be implemented using the address translation buffer 400 of FIG. 4.

The process 700 includes receiving 710 an address translation request associated with a privilege level, a virtualization mode, and a translation mode. For example, the address translation request may be received 710 via a bus (e.g., a PCIE bus). For example, the address translation request may be received 710 from a peripheral component of an integrated circuit by an address translation engine (e.g., the address translation engine 300). For example, the address translation request may be received 710 from a processor core of an integrated circuit. For example, the address translation request may be received 710 from an external endpoint device (e.g., the endpoint device 222). For example, the address translation request may be received 710 using a bus slave interface. The translation request may include an address (e.g., a supervisor virtual address (SVA), a guest physical address (GPA), or a guest virtual address (GVA)) to be translated and a hardware identifier that identifies a source of the address translation request.

The virtualization mode may be a binary parameter indicating whether an address translation request is being made by a virtual machine. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode.

The process 700 includes determining 712 a first tag including a translation tag that indicates the privilege level, the virtualization mode, and the translation mode. In some implementations, the translation tag may be a few bits (e.g., 2 bits or 3 bits) encoding one permutation from among a set of allowed permutations of the privilege level, the virtualization mode, and the translation mode. For example, translation tag may take values from the following table:

| Translation Tag | VM | Priv Level | Translation Mode | Address translation |
|---|---|---|---|---|
| SM | 0 | Machine | Single Stage | VA → PA |
| SS | 0 | Supervisor | Single Stage | VA → PA |
| VG | 1 | Supervisor | G-stage only | GPA → SPA |
| VS | 1 | Supervisor | VS-stage only | GVA → GPA |
| VN | 1 | Supervisor | Nested translation | GVA → SPA |

In some implementations, the translation tag may encode the privilege level, the virtualization mode, and the translation mode with separate respective fields of bits. For example, the first tag may also include a virtual address (e.g., a virtual page number lacking bits corresponding to an offset) and context identifier that identifies one or more potential sources of the address translation request.

The process 700 includes checking 720 an address translation buffer (e.g., the address translation buffer 400) for presence an entry with a tag matching the first tag. If (at 725) there is a matching tag, then the process 700 includes, based on a match with the first tag, determining 730 a translated address corresponding to an address of the address translation request. For example, the translated address may be determined 730 based on a physical address (e.g., a physical page number) stored in the data portion an entry of the address translation buffer with the matching tag. In some implementations, the entries of the address translation buffer are associated with respective valid flags, and only the tags for currently valid entries are checked 720 against the first tag. For example, software may send commands to the address translation buffer to invalidate individual entries or groups of entries in the address translation buffer. In some implementations, entries of the address translation buffer may be targeted for invalidation based on the translation tag portion of their respective tags. For example, the process 900 of FIG. 9 may be implemented to invalidate entries of the address translation buffer based on a privilege level indicated by the translation tags of those entries. In some implementations, the address translation buffer is part of two-level address translation cache.

If (at 725) there is no matching tag, then the process 700 includes, sending 740 the address translation request to a page table walk circuitry (e.g., the page table walk circuitry 500) to obtain a translated address. For example, the sending 740 the address translation request to a page table walk circuitry may invoke the process 800 of FIG. 8, starting at step 820 with the first translation tag. For example, consider repeating the process 700 with a second address translation request. The process 700 may further include receiving 710 the second address translation request associated with a second privilege level, a second virtualization mode, and a second translation mode; determining 712 a second tag including a translation tag that indicates the second privilege level, the second virtualization mode, and the second translation mode; checking 820 a page table entry cache for presence an entry with a tag matching the second tag; based on a match with the second tag, determining 830 an address of a page table in a multilevel page table corresponding to an address of the second address translation request; and completing 832 a page table walk using the address of the page table in the multilevel page table to obtain a second translated address corresponding to the address of the second address translation request.

Figure 8:
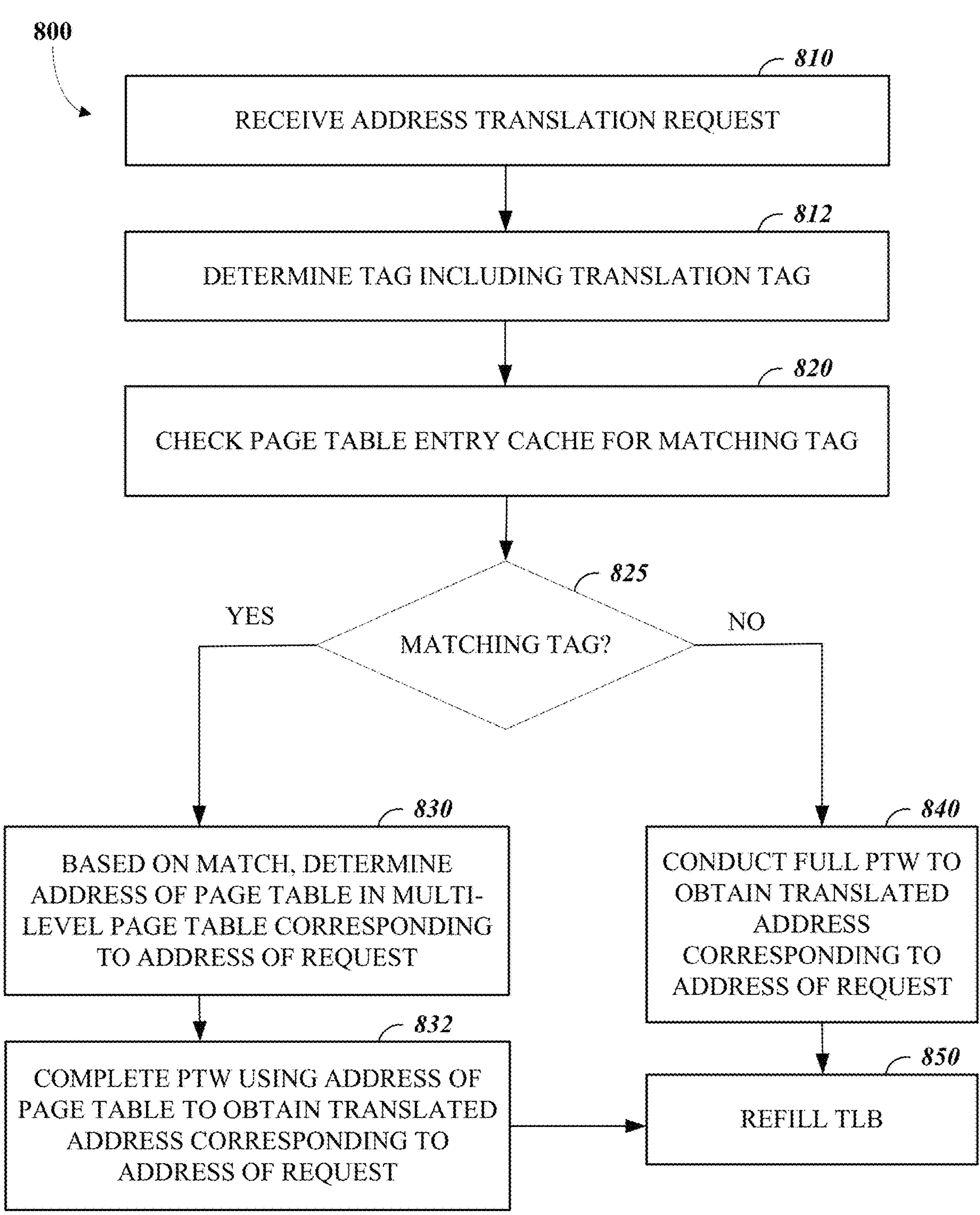
FIG. 8 is a flow chart of an example of a process for using a page table entry cache with tags that include an indication of a privilege level, a virtualization mode, and a translation mode.

FIG. 8 is a flow chart of an example of a process 800 for using a page table entry cache with tags that include an indication of a privilege level, a virtualization mode, and a translation mode. The process 800 includes receiving 810 an address translation request associated with a privilege level, a virtualization mode, and a translation mode; determining 812 a first tag including a translation tag that indicates the privilege level, the virtualization mode, and the translation mode; and checking 820 a page table entry cache for presence an entry with a tag matching the first tag. If (at 825) there is a matching tag, then the process 800 includes, based on a match with the first tag, determining 830 an address of a page table in a multilevel page table corresponding to an address of the address translation request; and completing 832 a page table walk using the address of the page table in the multilevel page table to obtain a translated address corresponding to the address of the address translation request. If (at 825) there is no matching tag, then the process 800 includes, conducting 840 a full page table walk to obtain a translated address corresponding to the address of the address translation request. The process 800 includes refilling 850 a translation lookaside buffer with the translated address. For example, the process 800 may be implemented using the system 100 of FIG. 1. For example, the process 800 may be implemented using the integrated circuit 210 of FIG. 2. For example, the process 800 may be implemented using the address translation engine 300 of FIG. 3. For example, the process 800 may be implemented using the page table walk circuitry 500 of FIG. 5.

The process 800 includes receiving 810 an address translation request associated with a privilege level, a virtualization mode, and a translation mode. For example, the address translation request may be received 810 via a bus (e.g., a PCIE bus). For example, the address translation request may be received 810 from a peripheral component of an integrated circuit by an address translation engine (e.g., the address translation engine 300). For example, the address translation request may be received 810 from a processor core of an integrated circuit. For example, the address translation request may be received 810 from an external endpoint device (e.g., the endpoint device 222). For example, the address translation request may be received 810 using a bus slave interface. The translation request may include an address (e.g., a supervisor virtual address (SVA), a guest physical address (GPA), or a guest virtual address (GVA)) to be translated and a hardware identifier that identifies a source of the address translation request.

The virtualization mode may be a binary parameter indicating whether an address translation request is being made by a virtual machine. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode.

The process 800 includes determining 812 a first tag including a translation tag that indicates the privilege level, the virtualization mode, and the translation mode. In some implementations, the translation tag may be a few bits (e.g., 2 bits or 3 bits) encoding one permutation from among a set of allowed permutations of the privilege level, the virtualization mode, and the translation mode. For example, translation tag may take values from the following table:

| Translation Tag | VM | Priv Level | Translation Mode | Address Translation |
|---|---|---|---|---|
| SM | 0 | Machine | Single Stage | VA → PA |
| SS | 0 | Supervisor | Single Stage | VA → PA |
| VG | 1 | Supervisor | G-stage only | GPA → SPA |

In some implementations, the translation tag may encode the privilege level, the virtualization mode, and the translation mode with separate respective fields of bits. For example, the first tag may also include a virtual address (e.g., a virtual page number lacking bits corresponding to an offset) and context identifier that identifies one or more potential sources of the address translation request.

The process 800 includes checking 820 a page table entry cache (e.g., the page table entry cache 520) for presence an entry with a tag matching the first tag. If (at 825) there is a matching tag, then the process 800 includes, based on a match with the first tag, determining 830 an address of a page table in a multilevel page table corresponding to an address of the address translation request; and completing 832 a page table walk using the address of the page table in the multilevel page table to obtain a translated address corresponding to the address of the address translation request. For example, the address of the page table may be determined 830 based on a physical address (e.g., a physical page number) stored in the data portion an entry of the page table entry cache with the matching tag. In some implementations, the entries of the page table entry cache are associated with respective valid flags, and only the tags for currently valid entries are checked 820 against the first tag. For example, software may send commands to the to invalidate individual entries or groups of entries in the page table entry cache. In some implementations, entries of the page table entry cache may be targeted for invalidation based on the translation tag portion of their respective tags. For example, the process 900 of FIG. 9 may be implemented to invalidate entries of the page table entry cache based on a privilege level indicated by the translation tags of those entries.

If (at 825) there is no matching tag, then the process 800 includes, conducting 840 a full page table walk to obtain a translated address corresponding to the address of the address translation request. In some implementations, the page table walk circuitry is configured to access a multi-level page table, and in which a first entry of the page table entry cache combines a first number of multiple levels and a second entry of the page table entry cache combines a second number of multiple levels that is different from the first number of multiple levels. For example, the tag of the first entry of the page table entry cache may have different length than the tag of the second entry of the page table entry cache. For example, the page table walk may be conducted 840 as described in relation to FIG. 6.

Figure 9:
FIG. 9 is a flow chart of an example of a process for invalidating entries in an address translation buffer and/or a page table entry cache with tags indicating a target privilege level.

FIG. 9 is a flow chart of an example of a process 900 for invalidating entries in an address translation buffer and/or a page table entry cache with tags indicating a target privilege level. The process 900 includes receiving 910 an invalidate command including an indication of a target privilege level; responsive to the invalidate command, invalidating 920 all entries in the address translation buffer (e.g., the address translation buffer 400) with translation tags indicating the target privilege level; and, responsive to the invalidate command, invalidating 920 all entries in the page table entry cache (e.g., the page table entry cache 520) with translation tags indicating the target privilege level. For example, the process 900 may be implemented using the system 100 of FIG. 1. For example, the process 900 may be implemented using the integrated circuit 210 of FIG. 2. For example, the process 900 may be implemented using the address translation engine 300 of FIG. 3. For example, the process 900 may be implemented using the address translation buffer 400 of FIG. 4. For example, the process 900 may be implemented using the page table walk circuitry 500 of FIG. 5.

Figure 10:
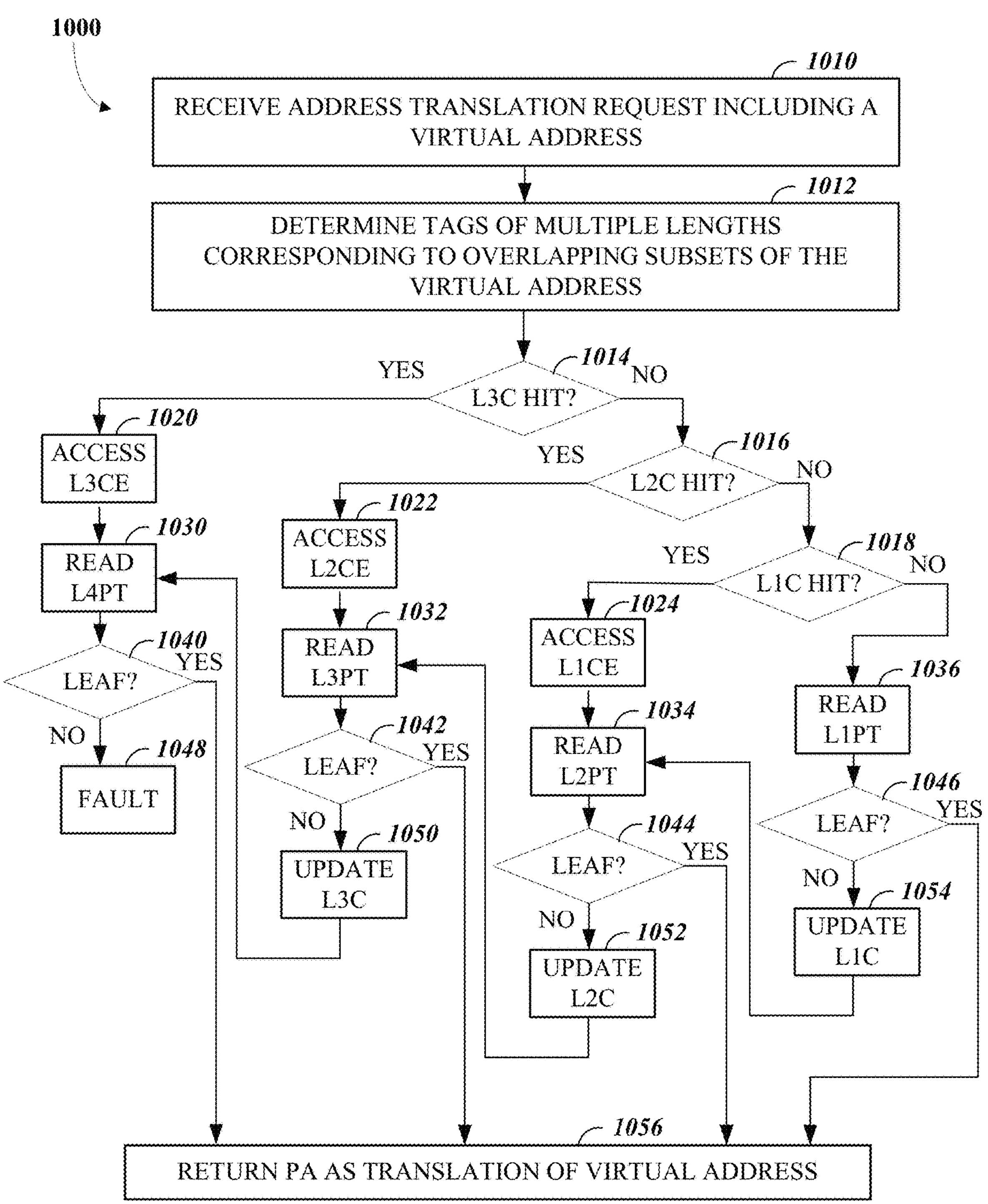
FIG. 10 is a flow chart of an example of a process for performing a single-stage page table walk with a page table entry cache with subsets with different tag lengths corresponding to different depth tables in a multi-level page table.

FIG. 10 is a flow chart of an example of a process 1000 for performing a single-stage page table walk with a page table entry cache with subsets with different tag lengths corresponding to different depth tables in a multi-level page table. The process 1000 includes receiving 1010 an address translation request including a virtual address; determining 1012 tags of multiple lengths corresponding to overlapping subsets of the virtual address; checking a page table entry cache for entries with a tag matching one of the determined tags (at 1014, 1016, and 1018). If (at 1014) there is a match with an entry corresponding to a level-3 page table in a multi-level page table, then the process 1000 includes accessing 1020 a physical address stored in the level-3 entry in the page table entry cache; continuing a page table walk using this physical address from the level-3 entry to read 1030 a level-4 page table in the multi-level page table stored in memory; and checking (at 1040) if the entry in the level-4 page table is a leaf entry. If (at 1040) the entry in the level-4 page table is a leaf entry, then a physical address including data (e.g., a page number) stored in the entry in the level-4 page table is returned 1056 as the translation of the virtual address, otherwise a fault condition is activated 1048 since there are only 4 levels in this example of a multi-level page table. If the is no match at 1014, then a next longest tag is checked and, if (at 1016) there is a match with an entry corresponding to a level-2 page table in the multi-level page table, then the process 1000 includes accessing 1022 a physical address stored in the level-2 entry in the page table entry cache; continuing the page table walk using this physical address from the level-2 entry to read 1032 a level-3 page table in the multi-level page table stored in memory; and checking (at 1042) if the entry in the level-3 page table is a leaf entry. If (at 1042) the entry in the level-3 page table is a leaf entry, then a physical address including data (e.g., a page number) stored in the entry in the level-3 page table is returned 1056 as the translation of the virtual address, otherwise data in the entry in the level-3 page table is a physical address pointing to a level-4 page table, which is used to update 1050 the page table entry cache with a new level-3 entry and to continue the page table walk at 1030. If the is no match at 1016, then a next longest tag is checked and, if (at 1018) there is a match with an entry corresponding to a level-1 page table in the multi-level page table, then the process 1000 includes accessing 1024 a physical address stored in the level-1 entry in the page table entry cache; continuing the page table walk using this physical address from the level-1 entry to read 1034 a level-2 page table in the multi-level page table stored in memory; and checking (at 1044) if the entry in the level-2 page table is a leaf entry. If (at 1044) the entry in the level-2 page table is a leaf entry, then a physical address including data (e.g., a page number) stored in the entry in the level-2 page table is returned 1056 as the translation of the virtual address, otherwise data in the entry in the level-2 page table is a physical address pointing to a level-3 page table, which is used to update 1052 the page table entry cache with a new level-2 entry and to continue the page table walk at 1032. If the is no match at 1018, then the page table walk commences by reading 1036 a level-1 page table in the multi-level page table stored in memory; and checking (at 1046) if the entry in the level-1 page table is a leaf entry. If (at 1046) the entry in the level-1 page table is a leaf entry, then a physical address including data (e.g., a page number) stored in the entry in the level-1 page table is returned 1056 as the translation of the virtual address, otherwise data in the entry in the level-1 page table is a physical address pointing to a level-2 page table, which is used to update 1054 the page table entry cache with a new level-1 entry and to continue the page table walk at 1034. For example, the process 1000 may be implemented using the system 100 of FIG. 1. For example, the process 1000 may be implemented using the integrated circuit 210 of FIG. 2. For example, the process 1000 may be implemented using the address translation engine 300 of FIG. 3. For example, the process 1000 may be implemented using the address translation buffer 400 of FIG. 4. For example, the process 1000 may be implemented using the page table walk circuitry 500 of FIG. 5.

The process 1000 includes receiving 1010 an address translation request including a virtual address (e.g., a supervisor virtual address (SVA) or a guest physical address (GPA)). For example, the address translation request may be received 1010 via a bus (e.g., a PCIE bus). For example, the address translation request may be received 1010 from a peripheral component of an integrated circuit by an address translation engine (e.g., the address translation engine 300). For example, the address translation request may be received 1010 from a processor core of an integrated circuit. For example, the address translation request may be received 1010 from an external endpoint device (e.g., the endpoint device 222). For example, the address translation request may be received 1010 using a bus slave interface.

In some implementations, a tag of an entry of the page table entry cache includes a translation tag that indicates a privilege level, a virtualization mode, and a translation mode. The virtualization mode may be a binary parameter indicating whether an address translation request is being made by a virtual machine. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode.

The process 1000 includes determining 1012 tags of multiple lengths corresponding to overlapping subsets of the virtual address. In some implementations, determining 1012 the tags may include determining 1012 a first tag of a first length based on a first subset of the virtual address, and determining 1012 a second tag of a second length, which is greater than the first length, based on a second subset of the virtual address, wherein the first subset and the second subset include overlapping bits. For example, determining 1012 the tags may include implementing the process 1700 of FIG. 17.

The process 1000 includes checking (at 1014, 1016, and 1018) a page table entry cache (e.g., the page table entry cache 520) for a virtual address using multiple tag lengths corresponding to overlapping subsets of the virtual address. The page table entry cache may be part of a page table walk circuitry configured to access a multi-level page table. In some implementations, a first entry of the page table entry cache combines a first number of multiple levels and a second entry of the page table entry cache combines a second number of multiple levels that is different from the first number of multiple levels. For example, a tag of the first entry of the page table entry cache may have different length than a tag of the second entry of the page table entry cache. Matches corresponding to longer tag lengths and thus deeper levels in the multi-level page table may be favored to expedite a page table walk. For example, responsive to finding matches at two or more different tag lengths, an entry of the page table entry cache corresponding to a match with a longest tag length may be selected from among the matches (e.g., a level-3 entry takes precedence over a level-2 entry, which takes precedence over a level-1 entry).

Once an entry in the page table cache entry with a matching tag is accessed (at 1020, 1022, or 1024), the process 1000 may include continuing (at 1030, 1032, or 1034) a page table walk using a physical address pointing to a page table that is stored in the selected entry of the page table entry cache. For example, a physical address of a page table in the multi-level page table may be determined based on data in an entry in the page table entry cache corresponding to the match. The page walk may continue until a leaf entry in the multi-level page table is read. A leaf entry may store data including a subset of a physical address (e.g., a page number), and this data may be used (e.g., along with an offset portion of the virtual address) to determine a physical address that is a translation of the virtual address.

Figure 11:
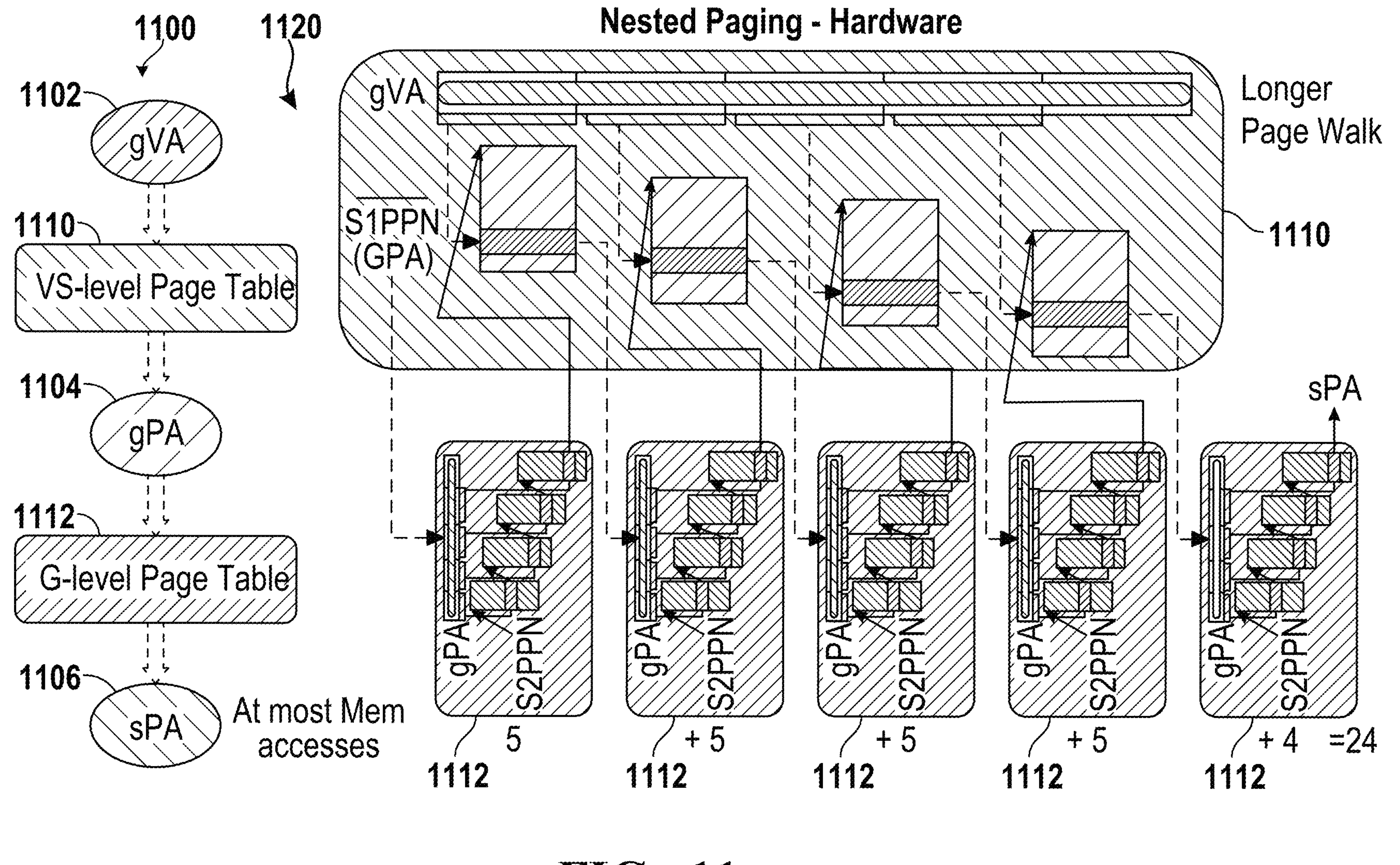
FIG. 11 is an illustration of an example of a nested two-stage page table walk for address translation using multi-level page tables.

FIG. 11 is an illustration of an example of a nested two-stage page table walk for address translation using multi-level page tables. A logical address flow 1100 for address translation in a virtual machine environment is shown on the left. In the logical address flow 1100, a guest virtual address 1102 of a guest virtual machine is first translated to a guest physical address 1104 using a first stage page table 1110 (e.g., a VS-stage page table). Next the guest physical address 1104 is translated to a system physical address 1106 using a second stage page table 1112 (e.g., a G-stage page table). A corresponding logical address flow 1120 for a nested two-stage address translation in a virtual machine environment is shown in more detail on the right, where each of the two page tables 1110 and 1112 is shown be implemented as a multi-level page table with a depth of up to four levels to reach a leaf entry in the page table. The logical address flow 1120 illustrates the interactions between the two page tables to perform a full nested two-stage address translation from scratch without the benefit of a hit in a page table entry cache. The logical address flow 1120 shows that a full nested two-stage page table walk could include up to 24 memory accesses in this scenario, including five separate walks of the second/G-stage page table 1112, which creates a significant impact on performance of the system.

Figure 12:
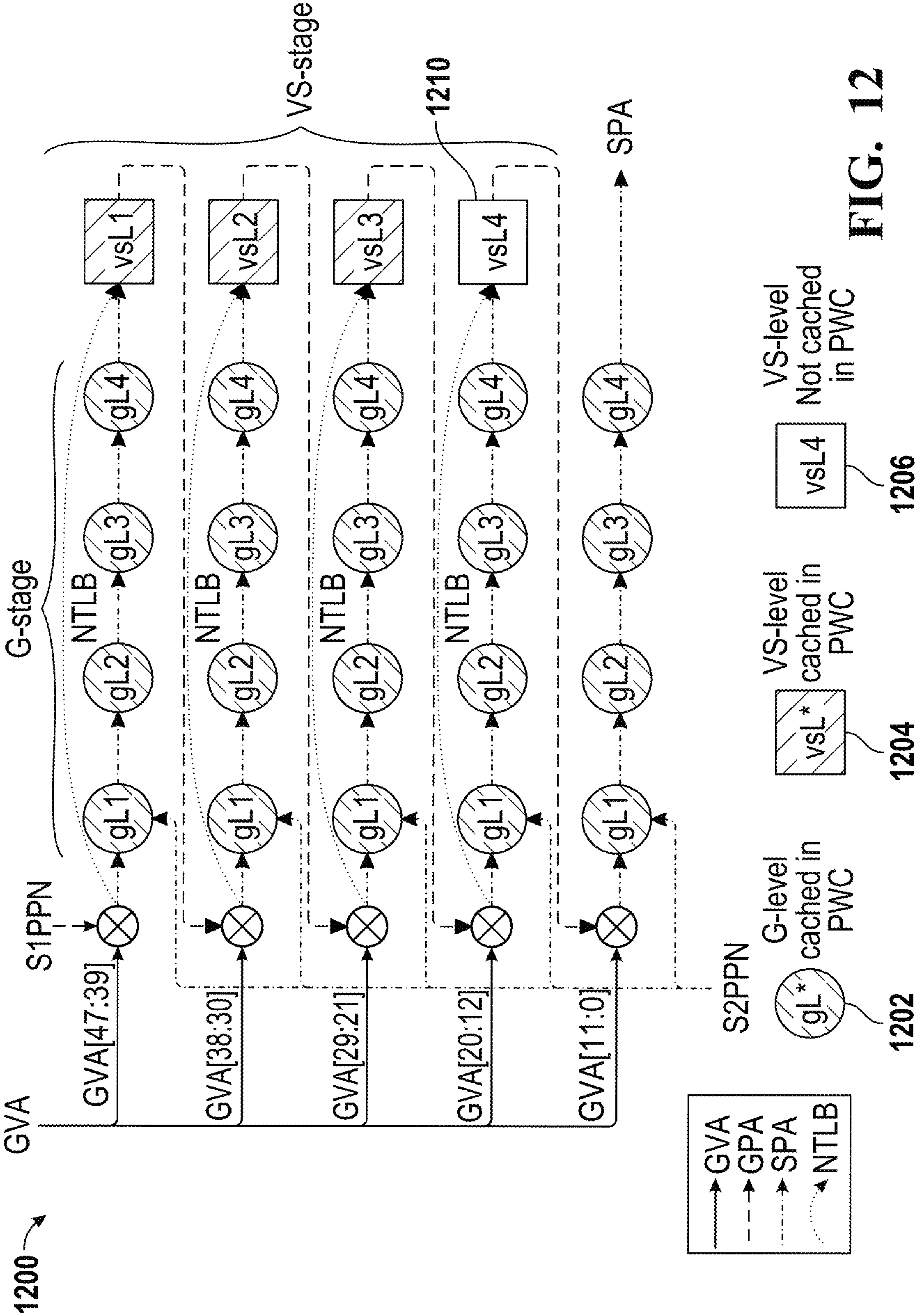
FIG. 12 is illustration of an example of a page table entry caching scheme for nested two-stage page table walks using multi-level page tables.

FIG. 12 is illustration of an example of a page table entry caching scheme for nested two-stage page table walks using multi-level page tables. A logical address flow 1200 for a nested two-stage page table walk for address translation in a virtual machine environment is shown. In this logical address flow 1200, each walk of the G-Stage page table proceeds horizontally from left to right, while the VS-stage page table walk proceeds vertically from top to bottom. The logical address flow 1200 shows which intermediate addresses determined during the page nested two-stage page table walk are cached in a page table entry cache in order to accelerate future page table walks using the same entries in these multi-level page tables. As shown in the key at the bottom left, cached entries in the G-stage page table are indicated by shaded circles 1202; cached entries in the VS-stage page table are indicated by shaded squares 1204; and uncached entries in the VS-stage page table are indicated by unshaded squares 1206. In this example, only the last, level-4 entry 1210 in the VS-stage page table is uncached and the other entries in the two page tables are all cached. In particular, all levels in the G-stage page table are cached.

Figure 13:
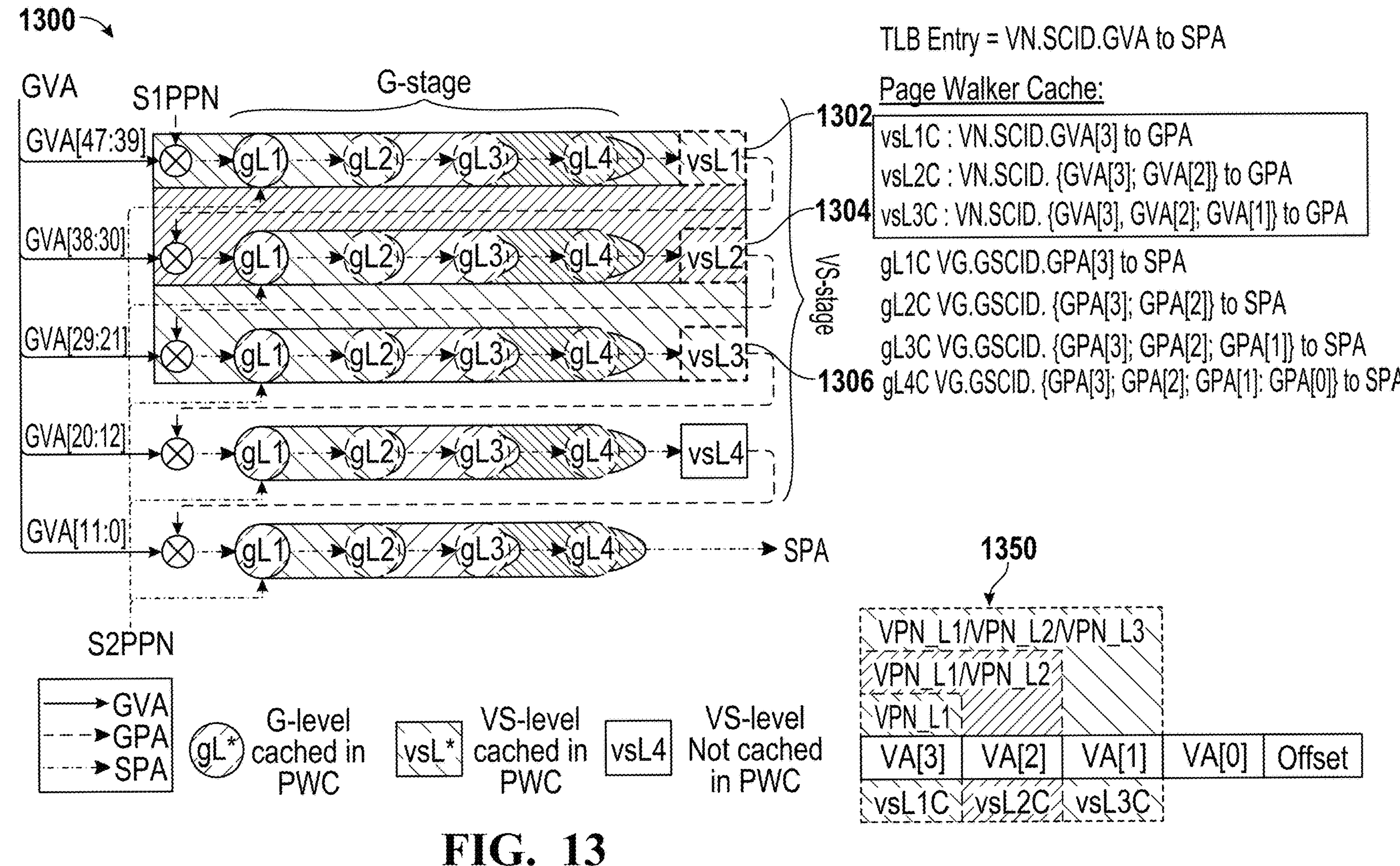
FIGS. 13-14 are illustrations of an example of a page table entry caching scheme for nested two-stage page table walks using multi-level page tables where page table entries have different tag lengths depending on the depth of a corresponding table in multi-level page table.
Figure 14:
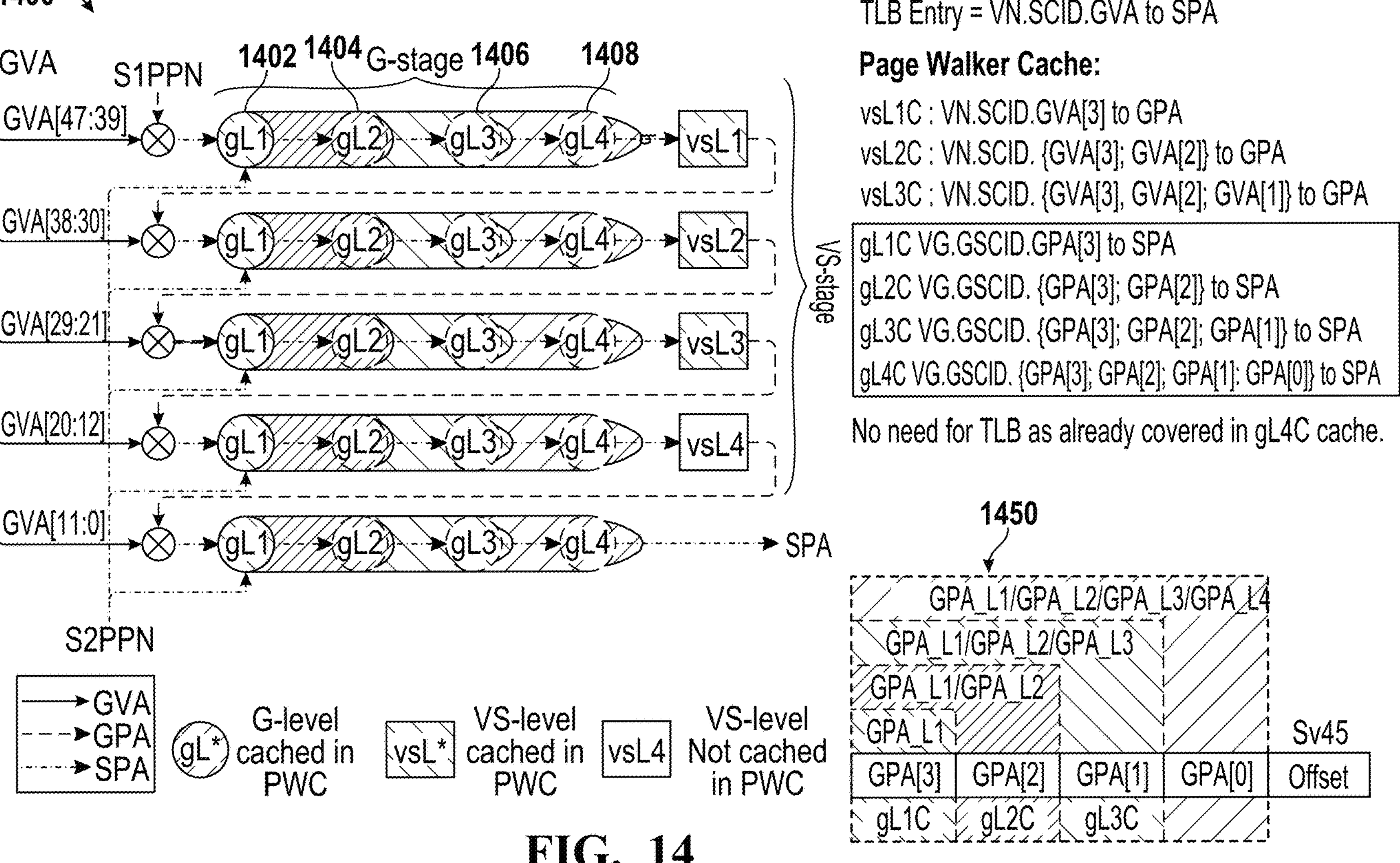

FIGS. 13-14 are illustrations of an example of a page table entry caching scheme for nested two-stage page table walks using multi-level page tables where page table entries have different tag lengths depending on the depth of a corresponding table in multi-level page table.

In FIG. 13, a logical address flow 1300 for a nested two-stage page table walk for address translation in a virtual machine environment is shown. The logical address flow 1300 illustrates how entries at different levels in a multi-level VS-stage page table are cached in a page table entry cache with corresponding tags of different lengths. A level-1 entry 1302 in the VS-stage page table has its guest physical address stored with a corresponding tag that includes a first subset (e.g., a virtual page number) of a guest virtual address being translated. A level-2 entry 1304 in the VS-stage page table has its guest physical address stored with a corresponding tag that includes a second subset (e.g., a virtual page number) of the guest virtual address being translated, where the second subset overlaps with the first subset, as shown in the memory map 1350 in the lower right portion of FIG. 13 (which is similar to the memory map 650 of FIG. 6). A level-3 entry 1306 in the VS-stage page table has its guest physical address stored with a corresponding tag that includes a third subset (e.g., a virtual page number) of the guest virtual address being translated, where the third subset overlaps with the first subset and the second subset, as shown in the memory map 1350.

In FIG. 14, a logical address flow 1400 for a nested two-stage page table walk for address translation in a virtual machine environment is shown. The logical address flow 1400 illustrates how entries at different levels in a multi-level G-stage page table are cached in a page table entry cache with corresponding tags of different lengths. A level-1 entry 1402 in the G-stage page table has its system physical address stored with a corresponding tag that includes a first subset (e.g., a virtual page number) of a guest physical address being translated. A level-2 entry 1404 in the G-stage page table has its system physical address stored with a corresponding tag that includes a second subset (e.g., a virtual page number) of the guest physical address being translated, where the second subset overlaps with the first subset, as shown in the memory map 1450 in the lower right portion of FIG. 14 (which is similar to the memory map 650 of FIG. 6). A level-3 entry 1406 in the G-stage page table has its system physical address stored with a corresponding tag that includes a third subset (e.g., a virtual page number) of the guest physical address being translated, where the third subset overlaps with the first subset and the second subset, as shown in the memory map 1450. A level-4 entry 1408 in the G-stage page table has its system physical address stored with a corresponding tag that includes a fourth subset (e.g., a virtual page number) of the guest physical address being translated, where the third subset overlaps with the first subset, the second subset, and the third subset, as shown in the memory map 1450. In this example, all four levels in this multi-level G-stage page table are cached in the page table entry cache, which effectively incorporates a G-stage translation lookaside buffer in the page table entry cache, since all leaf entries storing system physical addresses (e.g., page numbers) that are used for the final address translation may be stored directly in the page table entry cache. This may obviate the need for separate G-stage translation lookaside buffer (TLB).

Figure 15:
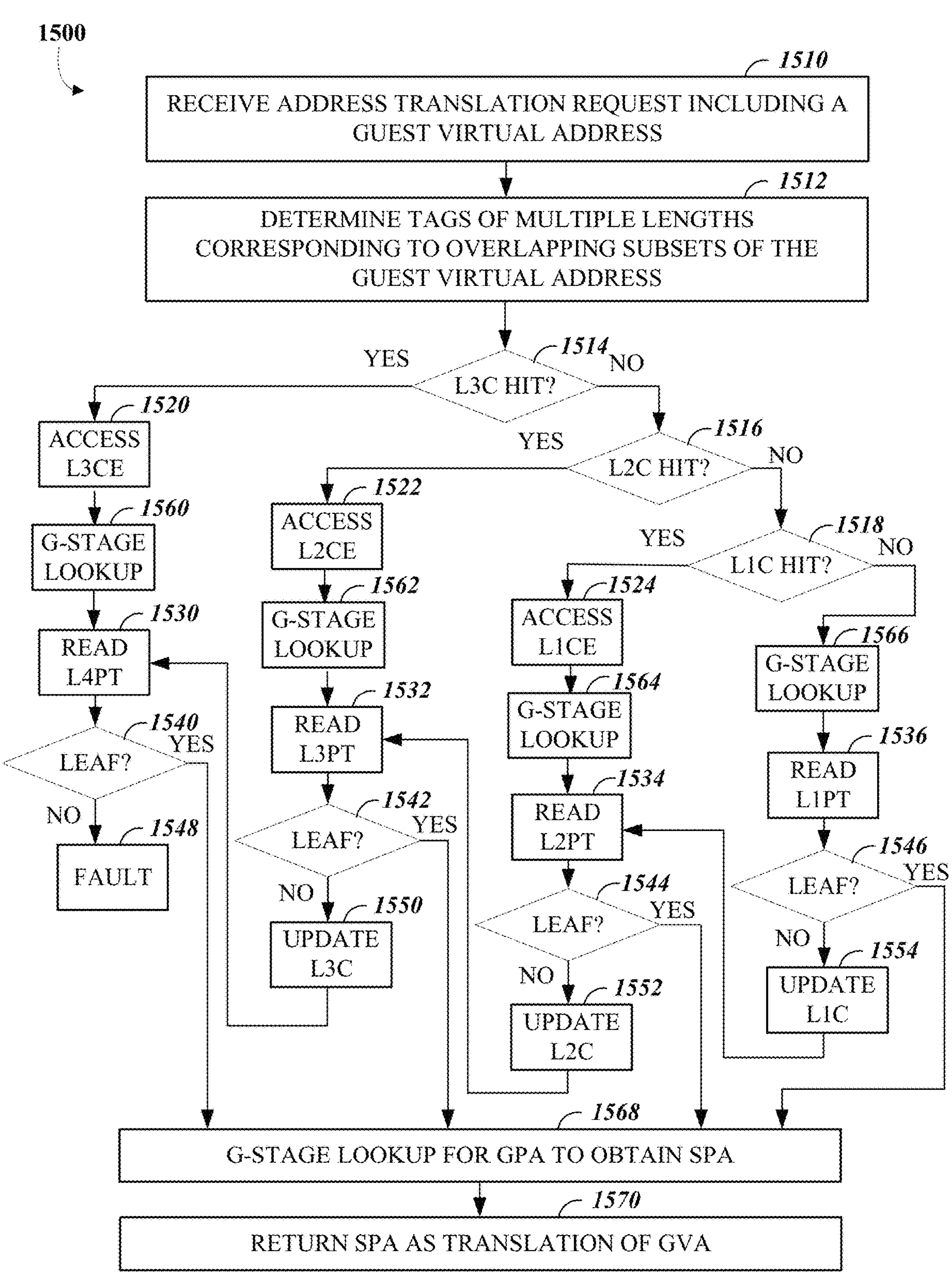
FIG. 15 is a flow chart of an example of a process for performing a VS-stage portion of a nested two-stage page table walk with a page table entry cache with subsets with different tag lengths corresponding to different depth tables in a multi-level page table.

FIG. 15 is a flow chart of an example of a process 1500 for performing a VS-stage portion of a nested two-stage page table walk with a page table entry cache with subsets with different tag lengths corresponding to different depth tables in a multi-level page table. The process 1500 includes receiving 1510 an address translation request including a guest virtual address; determining 1512 tags of multiple lengths corresponding to overlapping subsets of the guest virtual address; checking a page table entry cache for entries with a tag matching one of the determined tags (at 1514, 1516, and 1518). If (at 1514) there is a match with an entry corresponding to a level-3 page table in a multi-level page table, then the process 1500 includes accessing 1520 a guest physical address stored in the level-3 entry in the page table entry cache; performing G-stage lookup 1560 for this guest physical address using the process 1600 of FIG. 16 to translate this guest physical address to a system physical address; continuing a page table walk using this system physical address based on the level-3 entry to read 1530 a level-4 page table in the multi-level page table stored in memory; and checking (at 1540) if the entry in the level-4 page table is a leaf entry. If (at 1540) the entry in the level-4 page table is a leaf entry, then a guest physical address including data (e.g., a page number) stored in the entry in the level-4 page table is translated to a system physical address, by performing a G-stage lookup 1568 using the process 1600 of FIG. 16, and this system physical address is returned 1570 as the translation of the guest virtual address, otherwise a fault condition is activated 1548 since there are only 4 levels in this example of a multi-level page table. If the is no match at 1514, then a next longest tag is checked and, if (at 1516) there is a match with an entry corresponding to a level-2 page table in the multi-level page table, then the process 1500 includes accessing 1522 a guest physical address stored in the level-2 entry in the page table entry cache; performing G-stage lookup 1562 for this guest physical address using the process 1600 of FIG. 16 to translate this guest physical address to a system physical address; continuing a page table walk using this system physical address based on the level-2 entry to read 1532 a level-3 page table in the multi-level page table stored in memory; and checking (at 1542) if the entry in the level-3 page table is a leaf entry. If (at 1542) the entry in the level-3 page table is a leaf entry, then a guest physical address including data (e.g., a page number) stored in the entry in the level-3 page table is translated to a system physical address, by performing a G-stage lookup 1568 using the process 1600 of FIG. 16, and this system physical address is returned 1570 as the translation of the guest virtual address, otherwise data in the entry in the level-3 page table is a physical address pointing to a level-4 page table, which is used to update 1550 the page table entry cache with a new level-3 entry and to continue the page table walk at 1530. If the is no match at 1516, then a next longest tag is checked and, if (at 1518) there is a match with an entry corresponding to a level-1 page table in the multi-level page table, then the process 1500 includes accessing 1524 a guest physical address stored in the level-1 entry in the page table entry cache; performing G-stage lookup 1564 for this guest physical address using the process 1600 of FIG. 16 to translate this guest physical address to a system physical address; continuing a page table walk using this system physical address based on the level-1 entry to read 1534 a level-2 page table in the multi-level page table stored in memory; and checking (at 1544) if the entry in the level-2 page table is a leaf entry. If (at 1544) the entry in the level-2 page table is a leaf entry, then a guest physical address including data (e.g., a page number) stored in the entry in the level-2 page table is translated to a system physical address, by performing a G-stage lookup 1568 using the process 1600 of FIG. 16, and this system physical address is returned 1570 as the translation of the guest virtual address, otherwise data in the entry in the level-2 page table is a physical address pointing to a level-3 page table, which is used to update 1552 the page table entry cache with a new level-2 entry and to continue the page table walk at 1532. If the is no match at 1518, then the page table walk by performing G-stage lookup 1566 for a base address of the a multi-level page table for the VS-stage address translation using the process 1600 of FIG. 16 to translate this guest physical address to a system physical address; commencing a page table walk using this system physical address to read 1536 a level-1 page table in the multi-level page table stored in memory; and checking (at 1546) if the entry in the level-1 page table is a leaf entry. If (at 1546) the entry in the level-1 page table is a leaf entry, then a guest physical address including data (e.g., a page number) stored in the entry in the level-1 page table is translated to a system physical address, by performing a G-stage lookup 1568 using the process 1600 of FIG. 16, and this system physical address is returned 1570 as the translation of the guest virtual address, otherwise data in the entry in the level-1 page table is a physical address pointing to a level-2 page table, which is used to update 1554 the page table entry cache with a new level-1 entry and to continue the page table walk at 1534. For example, the process 1500 may be implemented using the system 100 of FIG. 1. For example, the process 1500 may be implemented using the integrated circuit 210 of FIG. 2. For example, the process 1500 may be implemented using the address translation engine 300 of FIG. 3. For example, the process 1500 may be implemented using the address translation buffer 400 of FIG. 4. For example, the process 1500 may be implemented using the page table walk circuitry 500 of FIG. 5.

The process 1500 includes receiving 1510 an address translation request including a guest virtual address (GVA). For example, the address translation request may be received 1510 via a bus (e.g., a PCIE bus). For example, the address translation request may be received 1510 from a peripheral component of an integrated circuit by an address translation engine (e.g., the address translation engine 300). For example, the address translation request may be received 1510 from a processor core of an integrated circuit. For example, the address translation request may be received 1510 from an external endpoint device (e.g., the endpoint device 222). For example, the address translation request may be received 1510 using a bus slave interface.

In some implementations, a tag of an entry of the page table entry cache includes a translation tag that indicates a privilege level, a virtualization mode, and a translation mode. The virtualization mode may be a binary parameter indicating whether an address translation request is being made by a virtual machine. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode.

The process 1500 includes determining 1512 tags of multiple lengths corresponding to overlapping subsets of the guest virtual address. In some implementations, determining 1512 the tags may include determining 1512 a first tag of a first length based on a first subset of the guest virtual address, and determining 1512 a second tag of a second length, which is greater than the first length, based on a second subset of the guest virtual address, wherein the first subset and the second subset include overlapping bits. For example, determining 1512 the tags may include implementing the process 1700 of FIG. 17. In some implementations, a tag of a first entry of the page table entry cache has different length than a tag of a second entry of the page table entry cache. For example, the tag matching a subset of the guest virtual address may include a translation tag that indicates a translation mode is nested translation mode.

The process 1500 includes checking (at 1514, 1516, and 1518) a page table entry cache (e.g., the page table entry cache 520) for the guest virtual address using multiple tag lengths corresponding to overlapping subsets of the guest virtual address. The page table entry cache may be part of a page table walk circuitry configured to access a multi-level page table. In some implementations, a first entry of the page table entry cache combines a first number of multiple levels and a second entry of the page table entry cache combines a second number of multiple levels that is different from the first number of multiple levels. For example, a tag of the first entry of the page table entry cache may have different length than a tag of the second entry of the page table entry cache. Matches corresponding to longer tag lengths and thus deeper levels in the multi-level page table may be favored to expedite a page table walk. For example, responsive to finding matches at two or more different tag lengths, an entry of the page table entry cache corresponding to a match with a longest tag length may be selected from among the matches (e.g., a level-3 entry takes precedence over a level-2 entry, which takes precedence over a level-1 entry).

The process 1500 includes, responsive to finding a tag matching a subset of the guest virtual address, accessing (at 1520, 1522, or 1524) a guest physical address that is stored in an entry of the page table entry cache corresponding to the tag matching a subset of the guest virtual address. Once an entry in the page table cache entry with a matching tag is accessed (at 1520, 1522, or 1524), the process 1500 may include performing a G-stage lookup (e.g., at 1560, 1562, or 1564) using the process 1600 of FIG. 16, to translate a guest physical address to a second system physical address; and continuing (at 1530, 1532, or 1534) a page table walk of a second multi-level page table (e.g., a VS-stage page table) using the second system physical address pointing to a page table in the second multi-level page table to determine a third system physical address as a translation of the guest virtual address. The page walk may continue until a leaf entry in the second multi-level page table is read. A leaf entry may store data including a subset of a guest physical address (e.g., a page number), and this data may be used (e.g., along with an offset portion of the virtual address), along with G-stage lookup 1568 for the guest physical address to determine a third physical address that is a translation of the guest virtual address.

Figure 16:
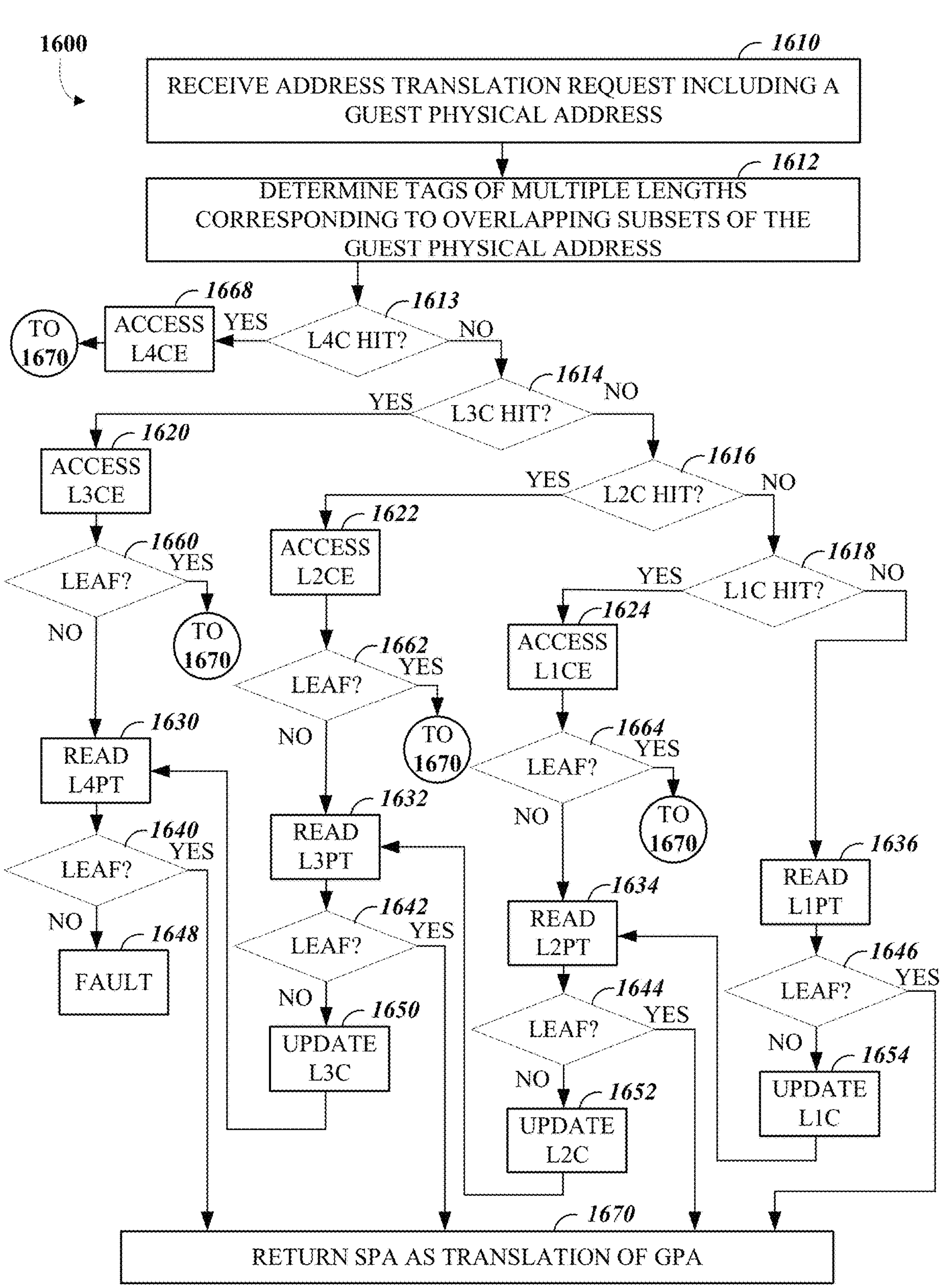
FIG. 16 is a flow chart of an example of a process for performing a G-stage page table walk with a page table entry cache with subsets with different tag lengths corresponding to different depth tables in a multi-level page table.

FIG. 16 is a flow chart of an example of a process 1600 for performing a G-stage page table walk with a page table entry cache with subsets with different tag lengths corresponding to different depth tables in a multi-level page table. The process 1600 includes receiving 1610 an address translation request including a guest physical address; determining 1612 tags of multiple lengths corresponding to overlapping subsets of the guest physical address; checking a page table entry cache for entries with a tag matching one of the determined tags (at 1613, 1614, 1616, and 1618). If (at 1613) there is a match with an entry corresponding to a level-4 page table in a first multi-level page table (e.g., a G-stage page table), then the process 1600 includes accessing 1668 a system physical address stored in the level-4 entry in the page table entry cache; and returning 1670 the system physical address as the translation of the guest physical address. If the is no match at 1613, then a next longest tag is checked and, if (at 1614) there is a match with an entry corresponding to a level-3 page table in a multi-level page table, then the process 1600 includes accessing 1620 a system physical address stored in the level-3 entry in the page table entry cache; if (at 1660) the level-3 entry in the page table entry cache is a leaf entry, then a system physical address including data (e.g., a page number) stored in the entry in the level-3 page table is returned 1670 as the translation of the guest physical address; otherwise, continuing a page table walk using this system physical address from the level-3 entry in the page table entry cache to read 1630 a level-4 page table in the multi-level page table stored in memory; and checking (at 1640) if the entry in the level-4 page table is a leaf entry. If (at 1640) the entry in the level-4 page table is a leaf entry, then a physical address including data (e.g., a page number) stored in the entry in the level-4 page table is returned 1670 as the translation of the virtual address, otherwise a fault condition is activated 1648 since there are only 4 levels in this example of a multi-level page table. If the is no match at 1614, then a next longest tag is checked and, if (at 1616) there is a match with an entry corresponding to a level-2 page table in the multi-level page table, then the process 1600 includes accessing 1622 a system physical address stored in the level-2 entry in the page table entry cache; if (at 1662) the level-2 entry in the page table entry cache is a leaf entry, then a system physical address including data (e.g., a page number) stored in the entry in the level-2 page table is returned 1670 as the translation of the guest physical address; otherwise, continuing the page table walk using this system physical address from the level-2 entry to read 1632 a level-3 page table in the multi-level page table stored in memory; and checking (at 1642) if the entry in the level-3 page table is a leaf entry. If (at 1642) the entry in the level-3 page table is a leaf entry, then a system physical address including data (e.g., a page number) stored in the entry in the level-3 page table is returned 1670 as the translation of the guest physical address, otherwise data in the entry in the level-3 page table is a system physical address pointing to a level-4 page table, which is used to update 1650 the page table entry cache with a new level-3 entry and to continue the page table walk at 1630. If the is no match at 1616, then a next longest tag is checked and, if (at 1618) there is a match with an entry corresponding to a level-1 page table in the multi-level page table, then the process 1600 includes accessing 1624 a system physical address stored in the level-1 entry in the page table entry cache; if (at 1664) the level-1 entry in the page table entry cache is a leaf entry, then a system physical address including data (e.g., a page number) stored in the level-1 entry is returned 1670 as the translation of the guest physical address; otherwise, continuing the page table walk using this system physical address from the level-1 entry to read 1634 a level-2 page table in the multi-level page table stored in memory; and checking (at 1644) if the entry in the level-2 page table is a leaf entry. If (at 1644) the entry in the level-2 page table is a leaf entry, then a system physical address including data (e.g., a page number) stored in the level-2 entry is returned 1670 as the translation of the guest physical address, otherwise data in the entry in the level-2 page table is a system physical address pointing to a level-3 page table, which is used to update 1652 the page table entry cache with a new level-2 entry and to continue the page table walk at 1632. If the is no match at 1618, then the page table walk commences by reading 1636 a level-1 page table in the multi-level page table stored in memory; and checking (at 1646) if the entry in the level-1 page table is a leaf entry. If (at 1646) the entry in the level-1 page table is a leaf entry, then a system physical address including data (e.g., a page number) stored in the entry in the level-1 page table is returned 1670 as the translation of the guest physical address, otherwise data in the entry in the level-1 page table is a system physical address pointing to a level-2 page table, which is used to update 1654 the page table entry cache with a new level-1 entry and to continue the page table walk at 1634. For example, the process 1600 may be implemented using the system 100 of FIG. 1. For example, the process 1600 may be implemented using the integrated circuit 210 of FIG. 2. For example, the process 1600 may be implemented using the address translation engine 300 of FIG. 3. For example, the process 1600 may be implemented using the address translation buffer 400 of FIG. 4. For example, the process 1600 may be implemented using the page table walk circuitry 500 of FIG. 5.

The process 1600 includes receiving 1610 an address translation request including a guest physical address (GPA). For example, the address translation request may be received 1610 via a bus (e.g., a PCIE bus). For example, the address translation request may be received 1610 from a peripheral component of an integrated circuit by an address translation engine (e.g., the address translation engine 300). For example, the address translation request may be received 1610 from a processor core of an integrated circuit. For example, the address translation request may be received 1610 from an external endpoint device (e.g., the endpoint device 222). For example, the address translation request may be received 1610 using a bus slave interface.

In some implementations, a tag of an entry of the page table entry cache includes a translation tag that indicates a privilege level, a virtualization mode, and a translation mode. The virtualization mode may be a binary parameter indicating whether an address translation request is being made by a virtual machine. In some implementations, the privilege level is from a set of privilege levels including a machine privilege level and a supervisor privilege level. In some implementations, the translation mode is from a set of translation modes including a single-stage translation mode, a G-stage only mode, a VS-stage only mode, and nested translation mode.

The process 1600 includes determining 1612 tags of multiple lengths corresponding to overlapping subsets of the guest physical address. In some implementations, determining 1612 the tags may include determining 1612 a first tag of a first length based on a first subset of the guest physical address, and determining 1612 a second tag of a second length, which is greater than the first length, based on a second subset of the guest physical address, wherein the first subset and the second subset include overlapping bits. For example, determining 1612 the tags may include implementing the process 1700 of FIG. 17. In some implementations, a tag of a first entry of the page table entry cache has different length than a tag of a second entry of the page table entry cache. For example, the tag matching a subset of the guest physical address may include a translation tag that indicates a translation mode is G-stage only mode.

The process 1600 includes checking (at 1614, 1616, and 1618) a page table entry cache (e.g., the page table entry cache 520) for the guest physical address using multiple tag lengths corresponding to overlapping subsets of the guest physical address. The page table entry cache may be part of a page table walk circuitry configured to access a multi-level page table. In some implementations, a first entry of the page table entry cache combines a first number of multiple levels and a second entry of the page table entry cache combines a second number of multiple levels that is different from the first number of multiple levels. For example, a tag of the first entry of the page table entry cache may have different length than a tag of the second entry of the page table entry cache. Matches corresponding to longer tag lengths and thus deeper levels in the multi-level page table may be favored to expedite a page table walk. For example, responsive to finding matches at two or more different tag lengths, an entry of the page table entry cache corresponding to a match with a longest tag length may be selected from among the matches (e.g., a level-3 entry takes precedence over a level-2 entry, which takes precedence over a level-1 entry).

The process 1600 includes, responsive to finding a tag matching a subset of the guest physical address, accessing a first system physical address that is stored in an entry of the page table entry cache corresponding to the tag matching a subset of the guest physical address. Once an entry in the page table cache entry with a matching tag is accessed (at 1620, 1622, or 1624), the process 1600 may include continuing (at 1630, 1632, or 1634) a page table walk using a system physical address pointing to a page table that is stored in the selected entry of the page table entry cache. For example, a first system physical address of a page table in the multi-level page table may be determined based on data in an entry in the page table entry cache corresponding to the match. The page walk may continue until a leaf entry in the multi-level page table is read. A leaf entry may store data including a subset of a system physical address (e.g., a page number), and this data may be used (e.g., along with an offset portion of the guest physical address) to determine a second system physical address that is a translation of the guest physical address. For example, the process 1600 may include determining (at 1670) a second system physical address as a translation of the guest physical address by continuing a page table walk of a first multi-level page table (e.g., a G-stage page table) using the first system physical address pointing to a page table in the first multi-level page table.

Figure 17:
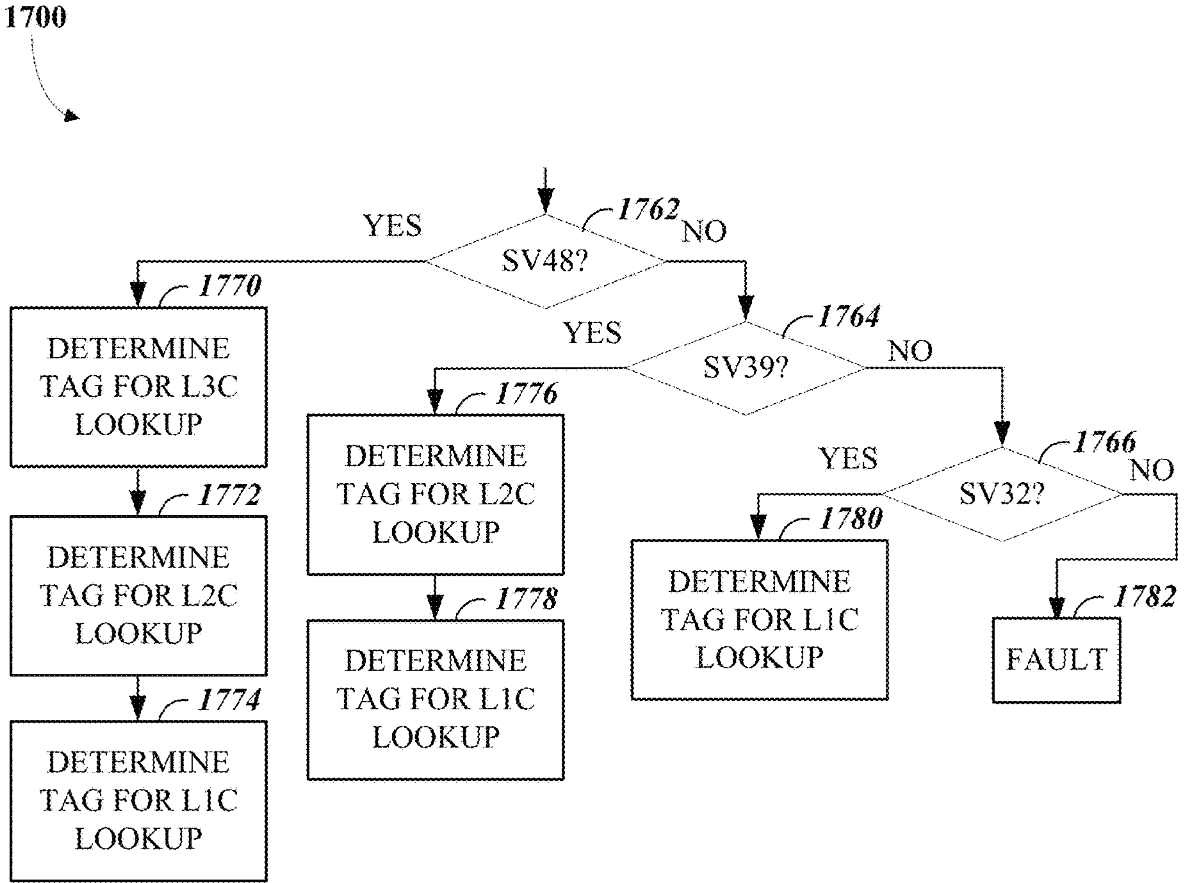
FIG. 17 is a flow chart of an example of a process for determining tags of multiple lengths corresponding to overlapping subsets of an address to be translated.

FIG. 17 is a flow chart of an example of a process 1700 for determining tags of multiple lengths corresponding to overlapping subsets of an address to be translated. The process 1700 includes checking 1762 whether an input address (e.g., a virtual address, a guest physical address, or a guest virtual address) for translation is in the Sv48 format; checking 1764 whether the input address translation is in the Sv39 format; and checking 1766 whether the input address translation is in the Sv32 format.

If (at 1762) the address for translation is in the Sv48 format, then the process 1700 includes determining 1770 a tag for lookup of level-3 entry in a page table entry cache. For example, a tag may be determined to include a concatenation of three subsets of bits from the input address corresponding to three virtual page numbers of the input address. In some implementations, the tag includes a translation tag that indicates a privilege level, a virtualization mode, and a translation mode (e.g., single-stage translation mode, a G-stage only mode, a VS-stage only mode, or nested translation mode). In some implementations, the tag includes a context identifier that indicates a source of an address translation request. For example, the tag for a level-3 entry may be formatted as:

Trans Tag. SCID.VPN[3]. VPN[2]. VPN[1]

For example, the tag for a level-3 entry may be formatted as:

TransTag. SCID.GVA[3].GVA[2] GVA[1]

For example, the tag for a level-3 entry may be formatted as:

Trans Tag. GSCID.GPA[3].GPA[2] GPA[1]

The process 1700 includes determining 1772 a tag for lookup of level-2 entry in a page table entry cache. For example, a tag may be determined to include a concatenation of two subsets of bits from the input address corresponding to two virtual page numbers of the input address. For example, the tag for a level-2 entry may be formatted as:

Trans Tag. SCID.VPN[3]. VPN[2]

For example, the tag for a level-2 entry may be formatted as:

Trans Tag. SCID.GVA[3].GVA[2]

For example, the tag for a level-2 entry may be formatted as:

Trans Tag.GSCID.GPA[3].GPA[2]

The process 1700 includes determining 1774 a tag for lookup of level-1 entry in a page table entry cache. For example, a tag may be determined to include a subset of bits from the input address corresponding to a virtual page number of the input address. For example, the tag for a level-1 entry may be formatted as:

Trans Tag.SCID.VPN[3]

For example, the tag for a level-1 entry may be formatted as:

Trans Tag. SCID.GVA[3]

For example, the tag for a level-1 entry may be formatted as:

Trans Tag.GSCID.GPA[3]

If (at 1764) the address for translation is in the Sv39 format, then the process 1700 includes determining 1776 a tag for lookup of level-2 entry in a page table entry cache. For example, a tag may be determined to include a concatenation of two subsets of bits from the input address corresponding to two virtual page numbers of the input address. In some implementations, the tag includes a translation tag that indicates a privilege level, a virtualization mode, and a translation mode (e.g., single-stage translation mode, a G-stage only mode, a VS-stage only mode, or nested translation mode). In some implementations, the tag includes a context identifier that indicates a source of an address translation request. For example, the tag for a level-2 entry may be formatted as:

Trans Tag. SCID.VPN[2]. VPN[1]

For example, the tag for a level-2 entry may be formatted as:

Trans Tag. SCID.VPN[2]. VPN[1]

For example, the tag for a level-2 entry may be formatted as:

Trans Tag. GSCID.GPA[2] GPA[1]

The process 1700 includes determining 1778 a tag for lookup of level-1 entry in a page table entry cache. For example, a tag may be determined to include a subset of bits from the input address corresponding to a virtual page number of the input address. For example, the tag for a level-1 entry may be formatted as:

Trans Tag.SCID.VPN[2]

For example, the tag for a level-1 entry may be formatted as:

Trans Tag. SCID.VPN[2]

For example, the tag for a level-1 entry may be formatted as:

Trans Tag.GSCID.GPA[2]

If (at 1766) the address for translation is in the Sv32 format, then the process 1700 includes determining 1780 a tag for lookup of level-1 entry in a page table entry cache. For example, a tag may be determined to include a subset of bits from the input address corresponding to a virtual page number of the input address. In some implementations, the tag includes a translation tag that indicates a privilege level, a virtualization mode, and a translation mode (e.g., single-stage translation mode, a G-stage only mode, a VS-stage only mode, or nested translation mode). In some implementations, the tag includes a context identifier that indicates a source of an address translation request. For example, the tag for a level-1 entry may be formatted as:

Trans Tag.SCID.VPN[1]

For example, the tag for a level-1 entry may be formatted as:

Trans Tag. SCID.VPN[1]

For example, the tag for a level-1 entry may be formatted as:

Trans Tag.GSCID.GPA[1]

If (at 1762, 1764, and 1766) the input address is not in a supported address format, a fault occurs 1782 (e.g., generating an error message and/or an interrupt.

In some implementations (not shown in FIG. 17), if (at 1762) the address for translation is in the Sv48 format, then the process 1700 includes determining a tag for lookup of level-4 entry in a page table entry cache. For example, the tag for a level-1 entry may be formatted as:

Trans Tag.GSCID.GPA[3].GPA[2] GPA[1].GPA[0]

Including level-4 entries in a page table entry cache may mitigate or eliminate need for a separate translation lookaside buffer in an address translation engine.

For example, the process 1700 may be implemented using the integrated circuit 210 of FIG. 2. For example, the process 1700 may be implemented using the address translation engine 300 of FIG. 3. For example, the process 1700 may be implemented using the address translation buffer 400 of FIG. 4. For example, the process 1700 may be implemented using the page table walk circuitry 500 of FIG. 5.

Figure 18:
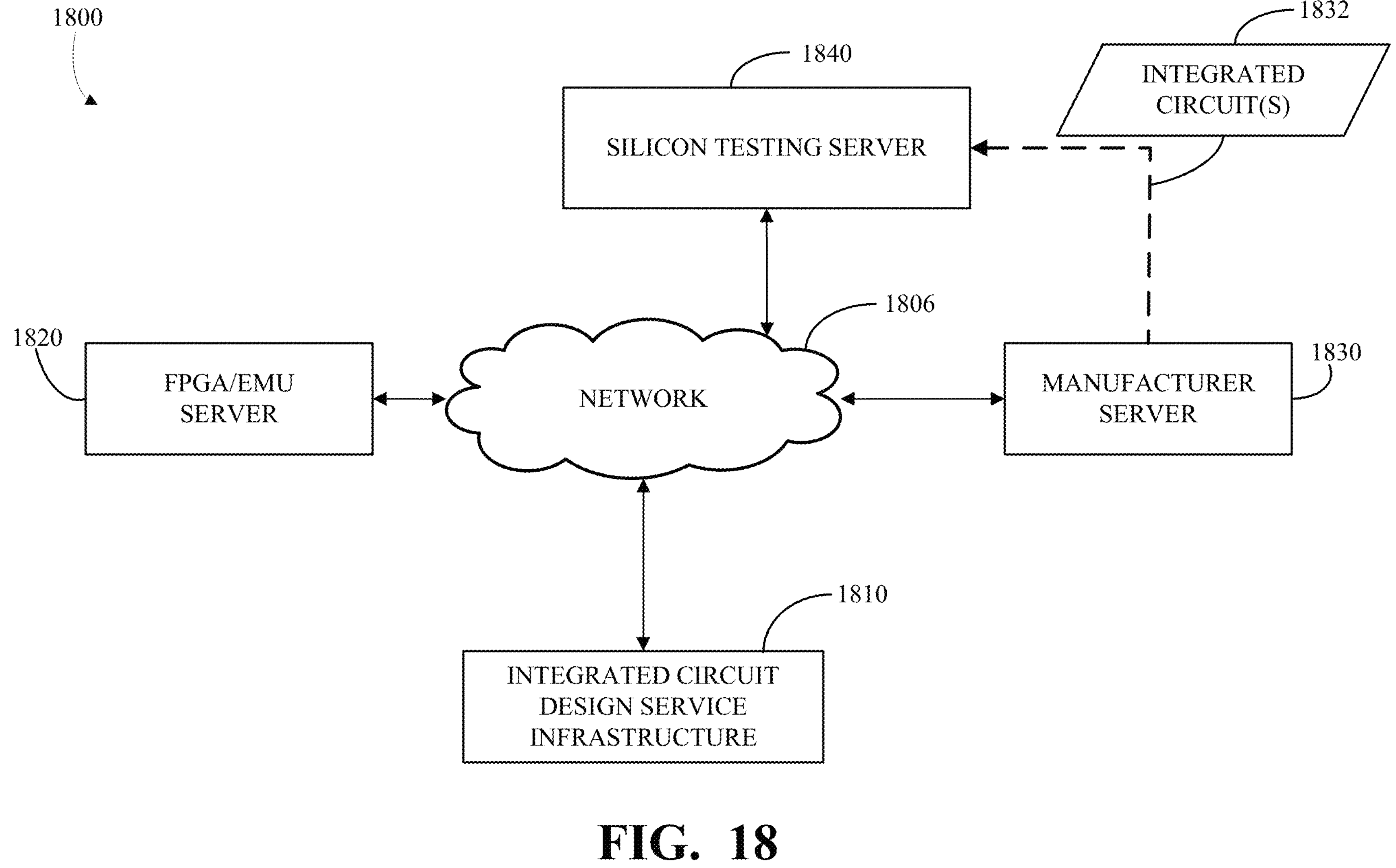
FIG. 18 is block diagram of an example of a system for facilitating generation and manufacture of integrated circuits.

FIG. 18 is block diagram of an example of a system 1800 for generation and manufacture of integrated circuits. The system 1800 includes a network 1806, an integrated circuit design service infrastructure 1810, a field programmable gate array (FPGA)/emulator server 1820, and a manufacturer server 1830. For example, a user may utilize a web client or a scripting API client to command the integrated circuit design service infrastructure 1810 to automatically generate an integrated circuit design based a set of design parameter values selected by the user for one or more template integrated circuit designs. In some implementations, the integrated circuit design service infrastructure 1810 may be configured to generate an integrated circuit design that includes the circuitry shown and described in FIGS. 1-5.

The integrated circuit design service infrastructure 1810 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 1810 may invoke (e.g., via network communications over the network 1806) testing of the resulting design that is performed by the FPGA/emulation server 1820 that is running one or more FPGAs or other types of hardware or software emulators. For example, the integrated circuit design service infrastructure 1810 may invoke a test using a field programmable gate array, programmed based on a field programmable gate array emulation data structure, to obtain an emulation result. The field programmable gate array may be operating on the FPGA/emulation server 1820, which may be a cloud server. Test results may be returned by the FPGA/emulation server 1820 to the integrated circuit design service infrastructure 1810 and relayed in a useful format to the user (e.g., via a web client or a scripting API client).

The integrated circuit design service infrastructure 1810 may also facilitate the manufacture of integrated circuits using the integrated circuit design in a manufacturing facility associated with the manufacturer server 1830. In some implementations, a physical design specification (e.g., a graphic data system (GDS) file, such as a GDS II file) based on a physical design data structure for the integrated circuit is transmitted to the manufacturer server 1830 to invoke manufacturing of the integrated circuit (e.g., using manufacturing equipment of the associated manufacturer). For example, the manufacturer server 1830 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 1810 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 1810 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 1830 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 1832, update the integrated circuit design service infrastructure 1810 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 1810 on the status of the packaging and delivery process periodically or asynchronously. In some implementations, status updates may be relayed to the user when the user checks in using the web interface and/or the controller might email the user that updates are available.

In some implementations, the resulting integrated circuits 1832 (e.g., physical chips) are delivered (e.g., via mail) to a silicon testing service provider associated with a silicon testing server 1840. In some implementations, the resulting integrated circuits 1832 (e.g., physical chips) are installed in a system controlled by silicon testing server 1840 (e.g., a cloud server) making them quickly accessible to be run and tested remotely using network communications to control the operation of the integrated circuits 1832. For example, a login to the silicon testing server 1840 controlling a manufactured integrated circuits 1832 may be sent to the integrated circuit design service infrastructure 1810 and relayed to a user (e.g., via a web client). For example, the integrated circuit design service infrastructure 1810 may control testing of one or more integrated circuits 1832, which may be structured based on an RTL data structure.

Figure 19:
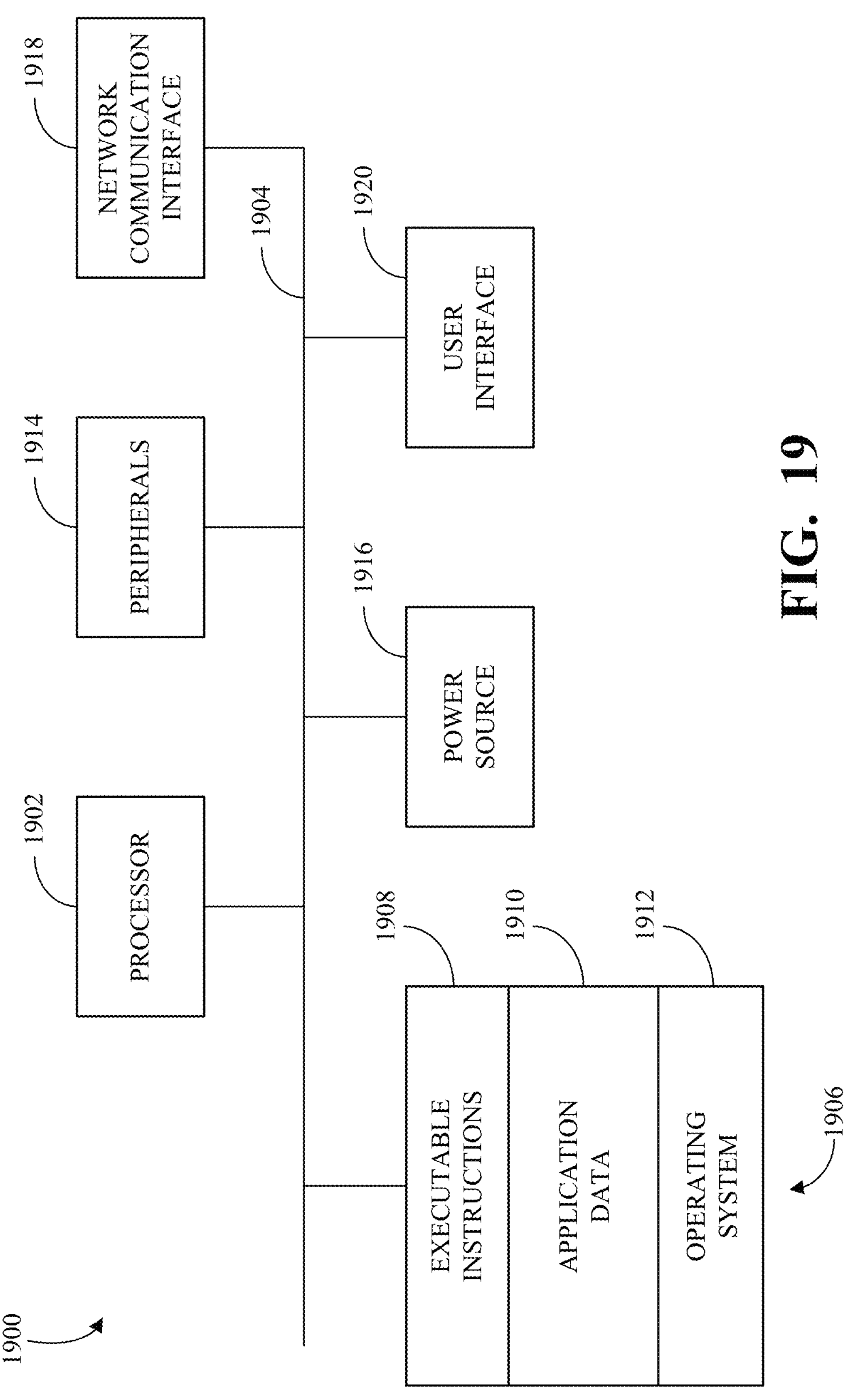
FIG. 19 is block diagram of an example of a system for facilitating generation of integrated circuits.

FIG. 19 is block diagram of an example of a system 1900 for facilitating generation of integrated circuits, for facilitating generation of a circuit representation for an integrated circuit, and/or for programming or manufacturing an integrated circuit. The system 1900 is an example of an internal configuration of a computing device. The system 1900 may be used to implement the integrated circuit design service infrastructure 1810, and/or to generate a file that generates a circuit representation of an integrated circuit design including the circuitry shown and described in FIGS. 1-5. The system 1900 can include components or units, such as a processor 1902, a bus 1904, a memory 1906, peripherals

1914, a power source 1916, a network communication interface 1918, a user interface 1920, other suitable components, or a combination thereof.

The processor 1902 can be a central processing unit (CPU), such as a microprocessor, and can include single or multiple processors having single or multiple processing cores. Alternatively, the processor 1902 can include another type of device, or multiple devices, now existing or hereafter developed, capable of manipulating or processing information. For example, the processor 1902 can include multiple processors interconnected in any manner, including hardwired or networked, including wirelessly networked. In some implementations, the operations of the processor 1902 can be distributed across multiple physical devices or units that can be coupled directly or across a local area or other suitable type of network. In some implementations, the processor 1902 can include a cache, or cache memory, for local storage of operating data or instructions.

The memory 1906 can include volatile memory, non-volatile memory, or a combination thereof. For example, the memory 1906 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 1906 can include another type of device, or multiple devices, now existing or hereafter developed, capable of storing data or instructions for processing by the processor 1902. The processor 1902 can access or manipulate data in the memory 1906 via the bus 1904. Although shown as a single block in FIG. 19, the memory 1906 can be implemented as multiple units. For example, a system 1900 can include volatile memory, such as RAM, and persistent memory, such as a hard drive or other storage.

The memory 1906 can include executable instructions 1908, data, such as application data 1910, an operating system 1912, or a combination thereof, for immediate access by the processor 1902. The executable instructions 1908 can include, for example, one or more application programs, which can be loaded or copied, in whole or in part, from non-volatile memory to volatile memory to be executed by the processor 1902. The executable instructions 1908 can be organized into programmable modules or algorithms, functional programs, codes, code segments, or combinations thereof to perform various functions described herein. For example, the executable instructions 1908 can include instructions executable by the processor 1902 to cause the system 1900 to automatically, in response to a command, generate an integrated circuit design and associated test results based on a design parameters data structure. The application data 1910 can include, for example, user files, database catalogs or dictionaries, configuration information or functional programs, such as a web browser, a web server, a database server, or a combination thereof. The operating system 1912 can be, for example, Microsoft Windows®, macOS®, or Linux®; an operating system for a small device, such as a smartphone or tablet device; or an operating system for a large device, such as a mainframe computer. The memory 1906 can comprise one or more devices and can utilize one or more types of storage, such as solid state or magnetic storage.

The peripherals 1914 can be coupled to the processor 1902 via the bus 1904. The peripherals 1914 can be sensors or detectors, or devices containing any number of sensors or detectors, which can monitor the system 1900 itself or the environment around the system 1900. For example, a system 1900 can contain a temperature sensor for measuring temperatures of components of the system 1900, such as the processor 1902. Other sensors or detectors can be used with the system 1900, as can be contemplated. In some implementations, the power source 1916 can be a battery, and the system 1900 can operate independently of an external power distribution system. Any of the components of the system 1900, such as the peripherals 1914 or the power source 1916, can communicate with the processor 1902 via the bus 1904.

The network communication interface 1918 can also be coupled to the processor 1902 via the bus 1904. In some implementations, the network communication interface 1918 can comprise one or more transceivers. The network communication interface 1918 can, for example, provide a connection or link to a network, such as the network 1806 shown in FIG. 18, via a network interface, which can be a wired network interface, such as Ethernet, or a wireless network interface. For example, the system 1900 can communicate with other devices via the network communication interface 1918 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 1920 can include a display; a positional input device, such as a mouse, touchpad, touchscreen, or the like; a keyboard; or other suitable human or machine interface devices. The user interface 1920 can be coupled to the processor 1902 via the bus 1904. Other interface devices that permit a user to program or otherwise use the system 1900 can be provided in addition to or as an alternative to a display. In some implementations, the user interface 1920 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 1914. The operations of the processor 1902 can be distributed across multiple clients or servers, which can be coupled directly or across a local area or other suitable type of network. The memory 1906 can be distributed across multiple clients or servers, such as network-based memory or memory in multiple clients or servers performing the operations of clients or servers. Although depicted here as a single bus, the bus 1904 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an integrated circuit that includes. a page table walk circuitry including a page table entry cache, in which the page table walk circuitry is configured to access a multi-level page table, and in which a first entry of the page table entry cache combines a first number of multiple levels and a second entry of the page table entry cache combines a second number of multiple levels that is different from the first number of multiple levels.

In the first aspect, a tag of the first entry of the page table entry cache may have different length than a tag of the second entry of the page table entry cache. In the first aspect, the page table walk circuitry may be configured to: check the page table entry cache for a virtual address using multiple tag lengths corresponding to overlapping subsets of the virtual address; responsive to finding matches at two or more different tag lengths, select an entry of the page table entry cache corresponding to a match with a longest tag length from among the matches; and continue a page table walk using a physical address pointing to a page table that is stored in the selected entry of the page table entry cache. In the first aspect, a tag of the first entry of the page table entry cache may include a translation tag that indicates a privilege level, a virtualization mode, and a translation mode. In the first aspect, the translation mode may be from a set of translation modes including a single-stage translation mode, a G-stage only mode, a VS-stage only mode, and nested translation mode. In the first aspect, the multi-level page table may be a first multi-level page table that encodes a first stage address translation in a two-stage address translation, and the page table walk circuitry may be configured to: check the page table entry cache for a guest virtual address using multiple tag lengths corresponding to overlapping subsets of the guest virtual address; responsive to finding a tag matching a subset of the guest virtual address, access a guest physical address that is stored in an entry of the page table entry cache corresponding to the tag matching a subset of the guest virtual address; check the page table entry cache for the guest physical address using multiple tag lengths corresponding to overlapping subsets of the guest physical address; responsive to finding a tag matching a subset of the guest physical address, access a first system physical address that is stored in an entry of the page table entry cache corresponding to the tag matching a subset of the guest physical address; determine a second system physical address as a translation of the guest physical address by continuing a page table walk of the first multi-level page table using the first system physical address pointing to a page table in the first multi-level page table; and continue a page table walk of a second multi-level page table using the second system physical address pointing to a page table in the second multi-level page table. In the first aspect, a tag of the first entry of the first page table entry cache may have different length than a tag of the second entry of the first page table entry cache. In the first aspect, the tag matching a subset of the guest virtual address may include a translation tag that indicates a translation mode is nested translation mode. In the first aspect, the tag matching a subset of the guest physical address may include a translation tag that indicates a translation mode is G-stage only mode. In the first aspect, the multi-level page table may be a first multi-level page table that encodes a first stage address translation in a two-stage address translation, the page table entry cache may be a first page table entry cache, and the page table walk circuitry may further comprise: a second page table entry cache, in which the page table walk circuitry is configured to access a second multi-level page table that encodes a second stage address translation in the two-stage address translation, and in which a third entry of the second page table entry cache combines a third number of multiple levels and a fourth entry of the second page table entry cache combines a fourth number of multiple levels that is different from the third number of multiple levels. In the first aspect, a tag of the first entry of the first page table entry cache may have different length than a tag of the second entry of the first page table entry cache, and a tag of the third entry of the second page table entry cache may have different length than a tag of the fourth entry of the second page table entry cache. In the first aspect, the page table walk circuitry may be configured to perform a two-stage nested translation from a guest virtual address to a physical address using the first page table entry cache and the second page table entry cache. In the first aspect, the page table walk circuitry may be configured to: check the first page table entry cache for a guest physical address using multiple tag lengths corresponding to overlapping subsets of the guest physical address; responsive to finding matches at two or more different tag lengths, select an entry of the first page table entry cache corresponding to a match with a longest tag length from among the matches; and continue a page table walk using a physical address pointing to a page table that is stored in the selected entry of the first page table entry cache.

In a second aspect, the subject matter described in this specification can be embodied in methods that include receiving an address translation request including a guest virtual address; checking a page table entry cache for the guest virtual address using multiple tag lengths corresponding to overlapping subsets of the guest virtual address; responsive to finding a tag matching a subset of the guest virtual address, accessing a guest physical address that is stored in an entry of the page table entry cache corresponding to the tag matching a subset of the guest virtual address; checking the page table entry cache for the guest physical address using multiple tag lengths corresponding to overlapping subsets of the guest physical address; responsive to finding a tag matching a subset of the guest physical address, accessing a first system physical address that is stored in an entry of the page table entry cache corresponding to the tag matching a subset of the guest physical address; determining a second system physical address as a translation of the guest physical address by continuing a page table walk of a first multi-level page table using the first system physical address pointing to a page table in the first multi-level page table; and continuing a page table walk of a second multi-level page table using the second system physical address pointing to a page table in the second multi-level page table to determine a third system physical address as a translation of the guest virtual address.

In the second aspect, a tag of a first entry of the page table entry cache may have different length than a tag of a second entry of the page table entry cache. In the second aspect, a first entry of the page table entry cache may combine a first number of multiple levels and a second entry of the page table entry cache may combine a second number of multiple levels that is different from the first number of multiple levels. In the second aspect, the tag matching a subset of the guest virtual address includes a translation tag that indicates a translation mode is nested translation mode. In the second aspect, the tag matching a subset of the guest physical address may include a translation tag that indicates a translation mode is G-stage only mode.

In a third aspect, the subject matter described in this specification can be embodied in methods that include receiving an address translation request including a virtual address; determining a first tag of a first length based on a first subset of the virtual address; determining a second tag of a second length, which is greater than the first length, based on a second subset of the virtual address, wherein the first subset and the second subset include overlapping bits checking a page table entry cache for presence an entry with a tag matching the first tag; checking the page table entry cache for presence an entry with a tag matching the second tag; and based on a match with the first tag or the second tag, determining a physical address of a page table based on data in an entry in the page table entry cache corresponding to the match.

In the third aspect, the methods may include completing a page table walk using the physical address to access the page table to determine a physical address that is a translation of the virtual address. In the third aspect, the methods may include, responsive to a match with the first tag and a match with the second tag, selecting an entry of the page table entry cache corresponding to the match with the second tag. For example, the physical address of the page table may be determined based on data of the selected entry.

In a fourth aspect, the subject matter described in this specification can be embodied in a non-transitory computer readable medium comprising a circuit representation that, when processed by a computer, is used to program or manufacture an integrated circuit that includes a page table walk circuitry including a page table entry cache, in which the page table walk circuitry is configured to access a multi-level page table, and in which a first entry of the page table entry cache combines a first number of multiple levels and a second entry of the page table entry cache combines a second number of multiple levels that is different from the first number of multiple levels.

In the fourth aspect, a tag of the first entry of the page table entry cache may have different length than a tag of the second entry of the page table entry cache. In the fourth aspect, the page table walk circuitry may be configured to: check the page table entry cache for a virtual address using multiple tag lengths corresponding to overlapping subsets of the virtual address; responsive to finding matches at two or more different tag lengths, select an entry of the page table entry cache corresponding to a match with a longest tag length from among the matches; and continue a page table walk using a physical address pointing to a page table that is stored in the selected entry of the page table entry cache. In the fourth aspect, a tag of the first entry of the page table entry cache may include a translation tag that indicates a privilege level, a virtualization mode, and a translation mode. In the fourth aspect, the translation mode may be from a set of translation modes including a single-stage translation mode, a G-stage only mode, a VS-stage only mode, and nested translation mode. In the fourth aspect, the multi-level page table may be a first multi-level page table that encodes a first stage address translation in a two-stage address translation, and the page table walk circuitry may be configured to: check the page table entry cache for a guest virtual address using multiple tag lengths corresponding to overlapping subsets of the guest virtual address; responsive to finding a tag matching a subset of the guest virtual address, access a guest physical address that is stored in an entry of the page table entry cache corresponding to the tag matching a subset of the guest virtual address; check the page table entry cache for the guest physical address using multiple tag lengths corresponding to overlapping subsets of the guest physical address; responsive to finding a tag matching a subset of the guest physical address, access a first system physical address that is stored in an entry of the page table entry cache corresponding to the tag matching a subset of the guest physical address; determine a second system physical address as a translation of the guest physical address by continuing a page table walk of the first multi-level page table using the first system physical address pointing to a page table in the first multi-level page table; and continue a page table walk of a second multi-level page table using the second system physical address pointing to a page table in the second multi-level page table. In the fourth aspect, a tag of the first entry of the first page table entry cache may have different length than a tag of the second entry of the first page table entry cache. In the fourth aspect, the tag matching a subset of the guest virtual address may include a translation tag that indicates a translation mode is nested translation mode. In the fourth aspect, the tag matching a subset of the guest physical address may include a translation tag that indicates a translation mode is G-stage only mode. In the fourth aspect, the multi-level page table may be a first multi-level page table that encodes a first stage address translation in a two-stage address translation, the page table entry cache may be a first page table entry cache, and the page table walk circuitry may further comprise: a second page table entry cache, in which the page table walk circuitry is configured to access a second multi-level page table that encodes a second stage address translation in the two-stage address translation, and in which a third entry of the second page table entry cache combines a third number of multiple levels and a fourth entry of the second page table entry cache combines a fourth number of multiple levels that is different from the third number of multiple levels. In the fourth aspect, a tag of the first entry of the first page table entry cache may have different length than a tag of the second entry of the first page table entry cache, and a tag of the third entry of the second page table entry cache may have different length than a tag of the fourth entry of the second page table entry cache. In the fourth aspect, the page table walk circuitry may be configured to perform a two-stage nested translation from a guest virtual address to a physical address using the first page table entry cache and the second page table entry cache. In the fourth aspect, the page table walk circuitry may be configured to: check the first page table entry cache for a guest physical address using multiple tag lengths corresponding to overlapping subsets of the guest physical address; responsive to finding matches at two or more different tag lengths, select an entry of the first page table entry cache corresponding to a match with a longest tag length from among the matches; and continue a page table walk using a physical address pointing to a page table that is stored in the selected entry of the first page table entry cache.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:

a page table walk circuitry including a page table entry cache, wherein the page table walk circuitry is configured to access a first multi-level page table that encodes a first stage address translation in a two-stage address translation, wherein a first entry of the page table entry cache includes a first tag and combines a first number of multiple levels, wherein a second entry of the page table entry cache includes a second tag and combines a second number of multiple levels that is different from the first number of multiple levels, wherein at least one of the first tag or the second tag are used checking the page table entry cache, wherein the first tag includes a translation tag that indicates a privilege level, a virtualization mode, and a translation mode;

wherein the page table walk circuitry is further configured to:

check the page table entry cache for a guest virtual address using multiple tag lengths corresponding to overlapping subsets of the guest virtual address;

responsive to finding a tag matching a subset of the guest virtual address, access a guest physical address that is stored in an entry of the page table entry cache corresponding to the tag matching a subset of the guest virtual address;

check the page table entry cache for the guest physical address using multiple tag lengths corresponding to overlapping subsets of the guest physical address;

responsive to finding a tag matching a subset of the guest physical address, access a first system physical address that is stored in an entry of the page table entry cache corresponding to the tag matching a subset of the guest physical address;

determine a second system physical address as a translation of the guest physical address by continuing a page table walk of the first multi-level page table using the first system physical address pointing to a page table in the first multi-level page table; and continue a page table walk of a second multi-level page table using the second system physical address pointing to a page table in the second multi-level page table.

2. The integrated circuit of claim 1, wherein the first tag has a different length than the second tag.

3. The integrated circuit of claim 1, wherein responsive to finding matches at two or more different tag lengths for the guest virtual address, the page table walk circuitry is configured to select an entry of the page table entry cache corresponding to a match with a longest tag length from among the matches and continue the page table walk using the guest physical address pointing to a page table that is stored in the selected entry of the page table entry cache.

4. The integrated circuit of claim 1, wherein the translation mode is from a set of translation modes consisting of a single-stage translation mode, a G-stage only mode, a VS-stage only mode, and a nested translation mode.

5. The integrated circuit of claim 1, wherein the page table entry cache is a first page table entry cache, and wherein the page table walk circuitry further comprises:

a second page table entry cache, wherein the second multi-level page table encodes a second stage address translation in the two-stage address translation, and wherein a third entry of the second page table entry cache combines a third number of multiple levels and a fourth entry of the second page table entry cache combines a fourth number of multiple levels that is different from the third number of multiple levels.

6. The integrated circuit of claim 5, wherein responsive to finding matches at two or more different tag lengths for the guest physical address, the page table walk circuitry is configured to select an entry of the first page table entry cache corresponding to a match with a longest tag length from among the matches and continue the page table walk using the first system physical address pointing to a page table that is stored in the selected entry of the first page table entry cache.

7. A method comprising:

receiving an address translation request including a guest virtual address;

checking a page table entry cache for the guest virtual address using multiple tag lengths corresponding to overlapping subsets of the guest virtual address;

responsive to finding a tag matching a subset of the guest virtual address, accessing a guest physical address that is stored in an entry of the page table entry cache corresponding to the tag matching a subset of the guest virtual address;

checking the page table entry cache for the guest physical address using multiple tag lengths corresponding to overlapping subsets of the guest physical address;

responsive to finding a tag matching a subset of the guest physical address, accessing a first system physical address that is stored in an entry of the page table entry cache corresponding to the tag matching a subset of the guest physical address;

determining a second system physical address as a translation of the guest physical address by continuing a page table walk of a first multi-level page table using the first system physical address pointing to a page table in the first multi-level page table; and continuing a page table walk of a second multi-level page table using the second system physical address pointing to a page table in the second multi-level page table to determine a third system physical address as a translation of the guest virtual address.

8. The method of claim 7, wherein a tag of a first entry of the page table entry cache has a different length than a tag of a second entry of the page table entry cache.

9. The method of claim 7, wherein a first entry of the page table entry cache combines a first number of multiple levels and a second entry of the page table entry cache combines a second number of multiple levels that is different from the first number of multiple levels.

10. The method of claim 7, wherein the tag matching a subset of the guest virtual address includes a translation tag that indicates a translation mode is a nested translation mode.

11. The method of claim 7, wherein the tag matching a subset of the guest physical address includes a translation tag that indicates a translation mode is a G-stage only mode.

12. A non-transitory computer readable medium storing instructions, that upon execution, cause operations comprising:

receiving an address translation request including a guest virtual address;

checking a page table entry cache for the guest virtual address using multiple tag lengths corresponding to overlapping subsets of the guest virtual address;

responsive to finding a tag matching a subset of the guest virtual address, accessing a guest physical address that is stored in an entry of the page table entry cache corresponding to the tag matching a subset of the guest virtual address;

checking the page table entry cache for the guest physical address using multiple tag lengths corresponding to overlapping subsets of the guest physical address;

responsive to finding a tag matching a subset of the guest physical address, accessing a first system physical address that is stored in an entry of the page table entry cache corresponding to the tag matching a subset of the guest physical address;

determining a second system physical address as a translation of the guest physical address by continuing a page table walk of a first multi-level page table using the first system physical address pointing to a page table in the first multi-level page table; and continuing a page table walk of a second multi-level page table using the second system physical address pointing to a page table in the second multi-level page table to determine a third system physical address as a translation of the guest virtual address.

13. The non-transitory computer readable medium of claim 12, wherein a tag of a first entry of the page table entry cache has a different length than a tag of a second entry of the page table entry cache.

14. The non-transitory computer readable medium of claim 12, wherein a first entry of the page table entry cache combines a first number of multiple levels and a second entry of the page table entry cache combines a second number of multiple levels that is different from the first number of multiple levels.

15. The non-transitory computer readable medium of claim 12, wherein the tag matching a subset of the guest virtual address includes a translation tag that indicates a translation mode is a nested translation mode.

16. The non-transitory computer readable medium of claim 12, wherein the tag matching a subset of the guest physical address includes a translation tag that indicates a translation mode is a G-stage only mode.

* * * * *